United States Patent
Ikenaga et al.

(10) Patent No.: US 7,542,466 B2
(45) Date of Patent: Jun. 2, 2009

(54) SYSTEM AND METHOD OF INFORMATION COMMUNICATION, INFORMATION PROCESSING APPARATUS AND INFORMATION PROCESSING METHOD, PROGRAM AND RECORDING MEDIUM

(75) Inventors: Toshiya Ikenaga, Tokyo (JP); Yukihiko Aoki, Tokyo (JP); Shinichi Kawano, Kanagawa (JP); Takeshi Ozawa, Chiba (JP)

(73) Assignee: Sony Corporation, Tokyo (JP)

( * ) Notice: Subject to any disclaimer, the term of this patent is extended or adjusted under 35 U.S.C. 154(b) by 626 days.

(21) Appl. No.: 10/983,555

(22) Filed: Nov. 8, 2004

(65) Prior Publication Data

US 2005/0105543 A1 May 19, 2005

(30) Foreign Application Priority Data

Nov. 14, 2003 (JP) ............................ P2003-385305

(51) Int. Cl.
*H04L 12/28* (2006.01)

(52) U.S. Cl. ........................ 370/389; 370/401; 370/392; 709/245; 709/238; 709/249

(58) Field of Classification Search .................. 370/428
See application file for complete search history.

(56) References Cited

U.S. PATENT DOCUMENTS

| 7,242,681 | B1 * | 7/2007 | Van Bokkelen et al. ..... 370/389 |
| 7,243,141 | B2 | 7/2007 | Harris |
| 7,328,280 | B2 * | 2/2008 | Takeda et al. ............... 709/245 |
| 2004/0139227 | A1 * | 7/2004 | Takeda ....................... 709/245 |
| 2004/0139228 | A1 * | 7/2004 | Takeda et al. ............... 709/245 |
| 2005/0141445 | A1 * | 6/2005 | Dunas et al. ................ 370/316 |

FOREIGN PATENT DOCUMENTS

| JP | 2004-104357 | 4/2004 |
| JP | 2004-304317 | 10/2004 |
| JP | 2005-117587 | 4/2005 |
| JP | 2005-525750 | 8/2005 |
| WO | WO 03/096653 | 11/2003 |

* cited by examiner

*Primary Examiner*—Rafael Pérez-Gutiérrez
*Assistant Examiner*—German Viana Di Prisco
(74) *Attorney, Agent, or Firm*—Finnegan, Henderson, Farabow, Garrett & Dunner, L.L.P.

(57) ABSTRACT

In order to realize NAT traversal communication at low cost and without fail, local communication terminals connected as subordinates of a first router having a UPnP™ function obtain an IP address and a port number, both to be converted by a NAT function of the first router, on the basis of a UPnP™ protocol to register them in a relay server as exchange information for the NAT traversal. Local communication terminals connected as subordinates of a second router without the UPnP™ function specify an IP address to be converted by the NAT function of the second router on the basis of a packet obtained from a STUN server and estimate a port number to be converted by the NAT function of the second router to register them in the relay server as the exchange information for the NAT traversal. The present invention may be applied to a personal computer.

14 Claims, 15 Drawing Sheets

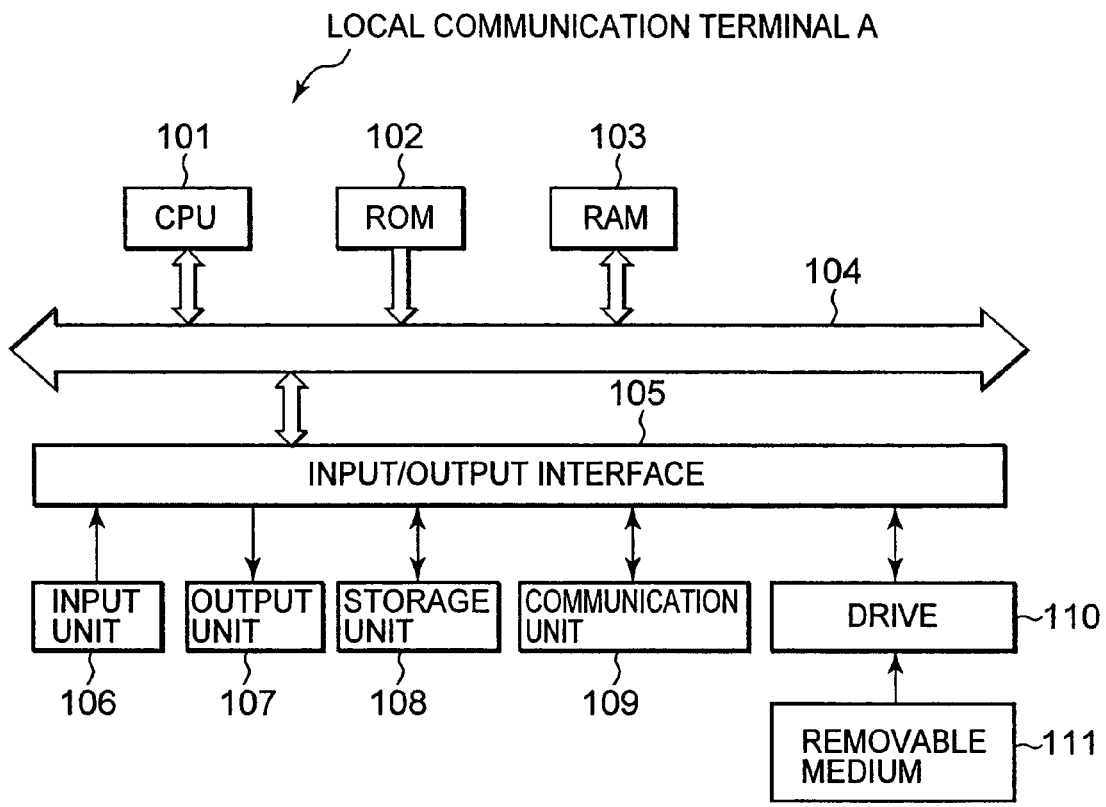
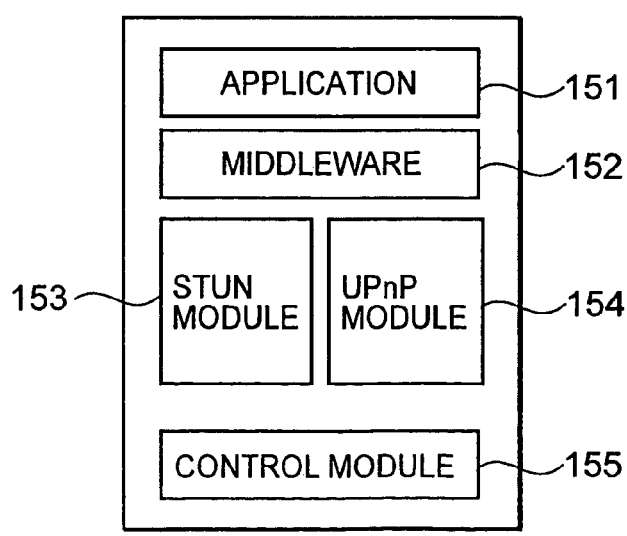

FIG. 8

| ITEM NAME | ITEM VALUE |
|---|---|
| IP | IP ADDRESS BY DOTTED DECIMAL NOTATION |
| PORT | PORT NUMBER |
| PROTOCOL | "TCP" AT TIME OF TCP AND "UDP" AT TIME OF UDP ARE SET |
| MODULE | "UPnP" AT TIME OF UPnP AND "STUN" AT TIME OF STUN ARE SET |

FIG. 9

IP=127.0.0.1&PORT=3010&PROTOCOL=TCP&MODULE=UPnP

| ID | IP ADDRESS | PORT NUMBER | MODULE |
|---|---|---|---|
| A | 127. 0. 0. 1 | 3011 | UPnP |
| B | 127. 10. 0. 1 | 3100 | STUN |
| C | 127. 20. 0. 1 | 3200 | UPnP |
| D | 127. 30. 0. 1 | 3300 | STUN |
| ⋮ | ⋮ | ⋮ | ⋮ |

FIG. 19

| | NAT (ROUTER) A | NAT (ROUTER) B | PROTOCOL | STUN | UPnP | PRESENT INVENTION |
|---|---|---|---|---|---|---|
| PATTERN 1 | UPnP | UPnP | TCP | × | ○ | ○ |
| PATTERN 2 | UPnP | Non UPnP | TCP | × | ○ | ○ |
| PATTERN 3 | Non UPnP | Non UPnP | TCP | × | × | × |
| PATTERN 4 | UPnP | UPnP | UDP | △ | ○ | ○ |
| PATTERN 5 | UPnP | Non UPnP | UDP | △ | ○ | ○ |
| PATTERN 6 | Non UPnP | Non UPnP | UDP | △ | × | △ |

SYSTEM AND METHOD OF INFORMATION COMMUNICATION, INFORMATION PROCESSING APPARATUS AND INFORMATION PROCESSING METHOD, PROGRAM AND RECORDING MEDIUM

CROSS REFERENCES TO RELATED APPLICATIONS

The present document is based on Japanese Priority Document JP 2003-385305, filed in the Japanese Patent Office on Nov. 14, 2003, the entire contents of which being incorporated herein by reference.

BACKGROUND OF THE INVENTION

1. Field of the Invention

The present invention relates to a system and a method of information communication, an information processing apparatus and an information processing method, a program and a recording medium, and more particularly to a system and a method of information communication, an information processing apparatus and an information processing method, a program and a recording medium, all for enabling the realization of surer NAT traversal.

2. Description of Related Art

Internet Protocol (hereinafter referred to as IP) is currently used as a routing protocol in the Internet. The most popular version of the IP is "4" (hereinafter referred to as IPv4) at present. The number of bits of a transmission source address and a transmission destination address which are used in this version is "32". In an global network, typically the Internet, a transmission source address and a transmission destination address of communication data of communication performed between communication terminal apparatus are severally made to be absolutely identifiable by assigning an address of 32 bits based on the IPv4 (hereinafter referred to as an IPv4 address) uniquely to each communication terminal.

However, because of a rapid enlargement of the utilization coefficient of the Internet, there is the possibility of the run-out of the IPv4 addresses. Accordingly, for solving the problem, the Internet Engineering Task Force (IETF) laid down a protocol as the version 6 of the IP (hereinafter referred to as IPv6) and has started to spread the IPv6. However, it actually needs much time and cost for shifting routing protocols to be used in the Internet totally to the IPv6, and it is difficult to solve this problem completely.

Accordingly, as a technique for enlarging a range of available addresses while using the existing IPv4, a method using an address space having a local (private) property, that is, "private address" has been proposed.

That is to say, the private address is an address assigned to each terminal in a network within a predetermined limited range, that is, a private network, differently from the address assigned to each terminal apparatus in a global network uniquely or in a manner of "one and only", (hereinafter referred to as a global address) as the IPv4 address. Each communication terminal, which is connected to the private network, and which a private address is assigned to, commonly owns a global address assigned to the private network.

Consequently, in a case where a communication terminal apparatus in a private network communicates with another communication terminal apparatus having a global address in the Internet by means of a private address, a process for converting the private address to a global address is needed. As a method for realizing the conversion, a network address translation (NAT) has been devised. In this case, each communication terminal is connected to a global network through the NAT.

Moreover, a method adopting a network address port translation (NAPT) has been also devised. The NAPT uses a port being a sub address (auxiliary address) provided below an address to convert a private address assigned to a communication terminal in a private network and a port (or a socket) to be used for communication to a global address and a port, respectively.

However, in a case of executing an application by which users need to communicate with each other directly, such as a video chat and an online game, (the so-called peer to peer (P2P) application) by using user terminals connected to private addresses in a private network, the so-called NAT traversal, in which the user terminals themselves obtain global addresses and ports, both converted by means of the NAT (or the NAPT), to perform communication, is needed.

A technique called as UPnP™ has been devised for solving a problem of this NAT traversal. UPnP™ is a function based on a protocol standardized by a UPnP™ forum. A communication terminal which is connected to a private network subordinate to the NAT and is mounted with the function can obtain a global address and a port, both converted by means of the NAT by performing communication defined by UPnP™.

Moreover, as another method for solving the problem of the NAT traversal, a technique called as Simple Traversal of UDP through NATs (STUN) has been also devised. According to STUN, a communication terminal connected to a local area network subordinate to the NAT obtains a global address converted by means of the NAT on the basis of the information obtained from a server (STUN server) connected to a global network.

Moreover, a technique for providing P2P communication by using a relay server and a router together with the NAT in a case where a terminal managed under a global address and a terminal managed under a private address perform communication with each other has been also proposed (see, for example, Patent Document 1).

[Patent Document 1] Japanese Patent Application Publication (KOKAI) No. 2001-345841.

SUMMARY OF THE INVENTION

However, in a case of using the UPnP™-enabled NAT (router) as a router, it is supposed that much time and cost are needed. That is, because there have been already many routers which do not support UPnP™, it is not realistic to solve the problem of the NAT traversal completely by replacing all of the routers to ones supporting UPnP™.

Moreover, a global address and a port number to be converted by means of the NAT can be obtained by means of STUN, but it is impossible to estimate the port number precisely regardless of the kind of the NAT. Consequently, it is impossible to provide a connection of a transmission control protocol (TCP) necessary for TCP communication, and there has been a problem that P2P communication cannot be provided in some cases.

The present invention was made in view of such a situation, and aims to implement the NAT traversal surely at a low cost.

An information communication system of the present invention includes a first information processing apparatus, a second information processing apparatus, an information management apparatus and an address information providing apparatus. The first information processing apparatus is connected to a first network, and is also connected to a second network through a first address information converting apparatus for converting address information. The second information processing apparatus is connected to a third network and is also connected to the second network through a second address information converting apparatus for converting address information. The information management apparatus is connected to the second network and manages the address information of the first information processing apparatus and the second information processing apparatus on the second network. The address information providing apparatus is connected to the second network and provides information pertaining to the address information on the second network to the first information processing apparatus and the second information processing apparatus. The information communication system is characterized in that the first information processing apparatus includes judging means; first registering means; and second registering means, and the information management apparatus includes receiving means; storing means; and providing means. The judging means judges whether or not the first address information converting apparatus has an address informing function for informing the address of the first information processing apparatus on the second network. The first registering means obtains the address information of the first information processing apparatus on the second network by the address informing function to register the obtained address information in the information management apparatus in a case where the judging means judges that the first address information converting apparatus has the address informing function. The second registering means estimates the address information of the first information processing apparatus on the second network on the basis of the information provided from the address information providing apparatus to register the estimated address information in the information management apparatus in a case where the judging means judges that the first address information converting apparatus does not have the address informing function. The receiving means receives the address information of the first or the second information processing apparatus on the second network. The storing means stores the address information received by the receiving means. The providing means provides the address information stored in the storing means to the first or the second information processing apparatus. The information communication system is further characterized in that the first information processing apparatus obtains the address information of the second information processing apparatus on the second network from the information management apparatus to communicate with the second information processing apparatus.

An information communication method of the present invention is an information communication method of an information communication system including: a first information processing apparatus connected to a first network, the first information processing apparatus also connected to a second network through a first address information converting apparatus for converting address information; a second information processing apparatus connected to a third network, the second information processing apparatus connected to the second network through a second address information converting apparatus for converting address information; an information management apparatus connected to the second network for managing the address information of the first information processing apparatus and the second information processing apparatus on the second network; and an address information providing apparatus connected to the second network for providing information pertaining to the address information on the second network to the first information processing apparatus and the second information processing apparatus. The information communication method is characterized by the steps of: judging whether or not the first address information converting apparatus has an address information informing function for informing the address information of the first information processing apparatus on the second network, obtaining the address information of the first information processing apparatus on the second network by the address information informing function to register the obtained address information in the information management apparatus in a case where the first address information converting apparatus is judged to have the address information informing function, estimating the address information of the first information processing apparatus on the second network on the basis of the information provided from the address information providing apparatus to register the estimated address information in the information management apparatus in a case where the first address information converting apparatus is judged not to have the address information informing function, receiving the address information of the first or the second information processing apparatus on the second network through the information management apparatus, storing the received address information, providing the stored address information to the first or the second information processing apparatus, and obtaining the address information of the second information processing apparatus on the second network from the information management apparatus through the first information processing apparatus to communicate with the second information processing apparatus.

In the information communication system and the information communication method of the present invention, the first information processing apparatus judges whether or not the first address information converting apparatus has the address information informing function for informing the address information of the first information processing apparatus on the second network. In the case where the first address information converting apparatus is judged to have the address information informing function, the address information of the first information processing apparatus on the second network is obtained by the address information informing function, and the obtained address information is registered in the information management apparatus. In the case where the first address information converting apparatus is judged not to have the address information informing function, the address information of the first information processing apparatus on the second network is estimated on the basis of the information provided from the address information providing apparatus, and the estimated address information is registered in the information management apparatus. Moreover, the address information of the first or the second information processing apparatus on the second network received by the information management apparatus, and the received address information is stored. Then, the stored address information is provided to the first or the second information processing apparatus.

An information processing apparatus of the present invention is an information processing apparatus connected to a first network and also to a second network through an address information converting apparatus for converting address information. The information processing apparatus includes: judging means, first registering means, and second registering means. The judging means judges whether or not the address information converting apparatus has an address information informing function for informing the address information of the information processing apparatus on the second network. The first registering means obtains the address information of the information processing apparatus on the second network by the address information informing function to register the obtained address information in an information management apparatus connected to the second network in a case where the address information converting apparatus is judged to have the address information informing function. The second registering means estimates the address information of the information processing apparatus on the second network on the basis of the information provided from an address information providing apparatus connected to the second network for providing information pertaining to the address information of the information processing apparatus connected to the first network on the second network, and registers the estimated address information in the information management apparatus in a case where the judging means judges that the address information converting apparatus does not have the address information informing function.

The information processing apparatus can be configured so that the first and the second registering means may include setting means for setting identification information indicating whether or not the address information converting apparatus has the address information informing function, and that the identification information is further registered in the information management apparatus.

The information processing apparatus can be configured to further include protocol judging means for judging a protocol used for communication with another information processing apparatus at the time of communicating with the other information processing apparatus connected to a third network and also connected to the second network through another address information converting apparatus, TCP communication means for performing TCP communication with the other information processing apparatus in a case where the protocol judging means judges that the protocol used for the communication with the other information processing apparatus is TCP, and UDP communication means for performing UDP communication with the other information processing apparatus in a case where the protocol judging means judges that the protocol used for the communication with the other information processing apparatus is UDP.

The information processing apparatus can be configured so that the TCP communication means may include obtaining means for obtaining the address information and the identification information of the other information processing apparatus on the second network from the information management apparatus, and connection providing means for providing a TCP connection on the basis of the address information and the identification information on the second network, both pieces of information obtained by the obtaining means.

The information processing apparatus can be configured so that the connection providing means may include first identification information judging means for judging whether or not the address information converting apparatus has the address information informing function on the basis of the identification information of the information processing apparatus, and second identification information judging means for judging whether or not the other address information converting apparatus has the address information informing function on the basis of the identification information of the other information processing apparatus for enabling the provision of the TCP connection on the basis of judgment results of the first and the second identification information judging means.

The information processing apparatus can be configured so that the UDP communication means may include obtaining means for obtaining the address information and the identification information of the other-information processing apparatus on the second network from the information management apparatus, and communication preparing means for preparing the UDP communication on the basis of the address information and the identification information on the second network, both pieces of information obtained by the obtaining means.

The information processing apparatus can be configured so that the communication preparing means may include first identification information judging means for judging whether or not the address information converting apparatus has the address information informing function on the basis of the identification information of the information processing apparatus, and second identification information judging means for judging whether or not the other address information converting apparatus has the address information informing function on the basis of the identification information of the other information processing apparatus, and that the communication preparing means may prepare the UDP communication on the basis of judgment results of the first or the second identification information judging means.

An information processing method of the present invention is an information processing method of an information processing apparatus connected to a first network and also to a second network through an address information converting apparatus for converting address information, the information processing method characterized by including: a judging step of judging whether or not the address information converting apparatus has an address information informing function for informing the address information of the information processing apparatus on the second network, a first registering step of obtaining the address information of the information processing apparatus on the second network by the address information informing function to register the obtained address information in an information management apparatus connected to the second network in a case where the address information converting apparatus is judged to have the address information informing function by the process of the judging step, and a second registering step of estimating the address information of the information processing apparatus on the second network on the basis of the information provided from an address information providing apparatus connected to the second network for providing information pertaining to the address information of the information processing apparatus connected to the first network on the second network, and of registering the estimated address information in the information management apparatus in a case where the address information converting apparatus is judged not to have the address information informing function by the process of the judging step.

A program of the present invention is a program of an information processing apparatus connected to a first network and also to a second network through an address information converting apparatus for converting address information, the program makes a computer execute: a judgment controlling step of controlling the judgment of whether or not the address information converting apparatus has an address information informing function for informing the address information of the information processing apparatus on the second network, a first registration controlling step of performing control to obtain the address information of the information processing apparatus on the second network by the address information informing function to register the obtained address information in an information management apparatus connected to the second network in a case where the address information converting apparatus is judged to have the address information informing function by the process of the judgment controlling step, and a second registration controlling step of performing control to estimate the address information of the information processing apparatus on the second network on the basis of the information provided from an address information providing apparatus connected to the second network for providing information pertaining to the address information of the information processing apparatus connected to the first network on the second network, and to register the estimated address information in the information management apparatus in a case where the address information converting apparatus is judged not to have the address information informing function by the process of the judgment controlling step.

A recording medium of the present invention is a recording medium on which a program of an information processing apparatus is recorded, the information processing apparatus connected to a first network and also to a second network through an address information converting apparatus for converting address information, the recording medium is characterized by recording therein the program which makes a computer execute: a judgment controlling step of controlling the judgment of whether or not the address information converting apparatus has an address information informing function for informing the address information of the information processing apparatus on the second network, a first registration controlling step of performing control to obtain the address information of the information processing apparatus on the second network by the address information informing function to register the obtained address information in an information management apparatus connected to the second network in a case where the address information converting apparatus is judged to have the address information informing function by the process of the judgment controlling step, and a second registration controlling step of performing control to estimate the address information of the information processing apparatus on the second network on the basis of the information provided from an address information providing apparatus connected to the second network for providing information pertaining to the address information of the information processing apparatus connected to the first network on the second network, and to register the estimated address information in the information management apparatus in a case where the address information converting apparatus is judged not to have the address information informing function by the process of the judgment controlling step.

In the information processing apparatus, the information processing method and the program of the present invention, whether or not the address information converting apparatus has the address information informing function for informing the address information of the information processing apparatus on the second network is judged. In the case where the address information converting apparatus is judged to have the address information informing function, the address information of the information processing apparatus on the second network is obtained by the address information informing function, and the obtained address information is registered in the information management apparatus connected to the second network. In the case where the address information converting apparatus is judged not to have the address information informing function, the address information of the information processing apparatus on the second network is estimated on the basis of the information provided from the address information providing apparatus for providing the information pertaining to the address information of the information processing apparatus connected to the first network on the second network, the address information providing apparatus connected to the second network, and the estimated address information is registered in the information management apparatus.

According to the present invention, NAT traversal communication can be provided. In particular, the NAT traversal communication can be implemented surely at a low cost.

BRIEF DESCRIPTION OF THE DRAWINGS

FIG. 2 is a block diagram showing a configuration example of the local communication terminal shown in FIG. 1;

FIG. 3 is a block diagram showing a configuration example of a software of in the local communication terminal shown in FIG. 2;

FIG. 8 is a configuration example of exchange information;

FIG. 9 is a description example of the exchange information;

FIG. 19 is a diagram showing a pattern of the P2P communication which the present invention can provide.

PREFERRED EMBODIMENTS OF THE INVENTION

Figure 1:
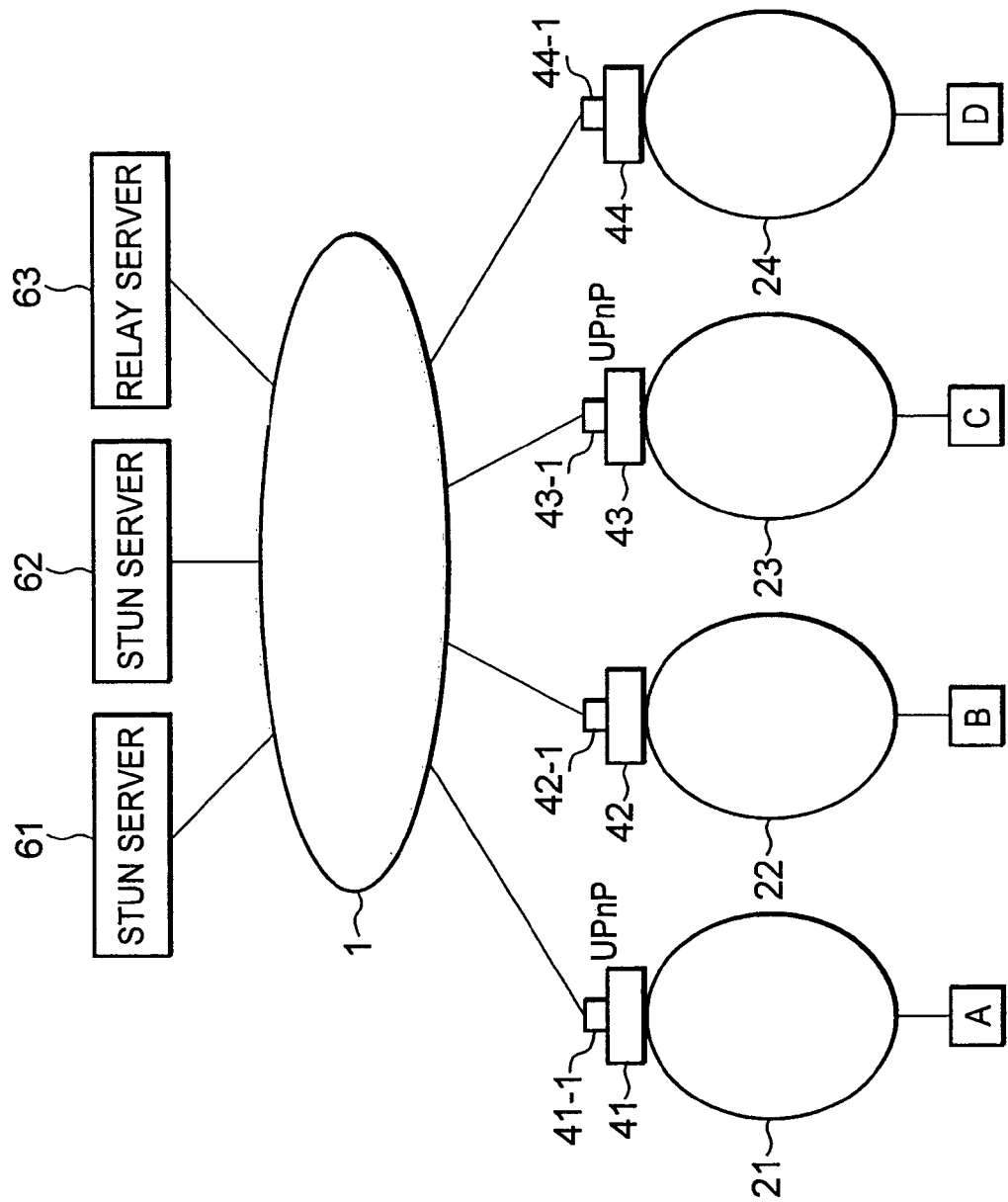
FIG. 1 is a block diagram showing a configuration example of an information communication system to which the present invention is applied.

In the following, embodiments of the present invention will be described. The correspondence relation between the invention described in the present specification and the embodiments of the invention is exemplified as follows. That is to say, this description aims to ascertain that the embodiments supporting the invention described in the present specification are described in the specification. Consequently, even if an embodiment which is described in the specification but is not described here exists, the fact does not mean that the embodiment does not correspond to the invention. On the contrary, even if an embodiment is described here as one corresponding to the invention, the fact does not mean that the embodiment does not corresponds to an invention other than the invention.

Moreover, the description does not mean that all of the inventions described in the specification are claimed. In other words, the description does not deny the existence of the invention which is described in the specification and is not claimed in this application, namely the existence of an invention which will be filed by dividing this application or be filed as an amended application or as an added application, are not denied.

The present invention provides an information communication system. The information communication system is an information communication system composed of: a first information processing apparatus (e.g. a local communication terminal A in FIG. 1) connected to a first network (e.g. a private network 21 in FIG. 1) and also to a second network (e.g. the Internet 1 in FIG. 1) through a first address information converting apparatus (e.g. a router 41 in FIG. 1) for converting address information (e.g. an IP address and a port number); a second information processing apparatus (e.g. a local communication terminal B in FIG. 1) connected to a third network (e.g. a private network 22 in FIG. 1) and also to the second network through a second address information converting apparatus (e.g. a router 42 in FIG. 1) for converting address information; an information management apparatus (e.g. a relay server 63 in FIG. 1) connected to the second network for managing the address information of the first information processing apparatus and the second information processing apparatus on the second network; and an address information providing apparatus (e.g. STUN servers 61 and 62 in FIG. 1) connected to the second network for providing information pertaining to the address information on the second network to the first information processing apparatus and the second information processing apparatus. The first information processing apparatus includes: judging means (e.g. a middleware 152 of FIG. 3 for executing a process at Step S3 in FIG. 6) for judging whether or not the first address information converting apparatus has an address informing function (e.g. UPnP™) for informing the address of the first information processing apparatus on the second network; first registering means (e.g. a UPnP module 154 in FIG. 3 for executing a process at Step S4 in FIG. 6) for obtaining the address information of the first information processing apparatus on the second network by the address informing function to register the obtained address information in the information management apparatus in a case where the judging means judges that the first address information converting apparatus has the address informing function; and second registering means (e.g. a STUN module 153 in FIG. 3 for executing a process at Step S5 in FIG. 6) for estimating the address information of the first information processing apparatus on the second network on the basis of the information (e.g. the port number of the NAT described in a response packet from the STUN servers 61 and 62) provided from the address information providing apparatus to register the estimated address information in the information management apparatus in a case where the judging means judges that the first address information converting apparatus does not have the address informing function. The information management apparatus includes: receiving means (e.g. a CPU 201 in FIG. 5 for executing a process at Step S61 in FIG. 11) for receiving the address information of the first or the second information processing apparatus on the second network; storing means (e.g. the CPU 201 in FIG. 5 for executing a process at Step S62 in FIG. 11) for storing the address information received by the receiving means; and providing means (e.g. the CPU 201 in FIG. 5 for executing an exchange information providing process in FIG. 15) for providing the address information stored in the storing means to the first or the second information processing apparatus. The first information processing apparatus obtains the address information of the second information processing apparatus on the second network from the information management apparatus (e.g. obtains by a process at Step S103 in FIG. 14 or Step S163 in FIG. 17) to communicate with the second information processing apparatus.

The present invention provides an information communication method. The information communication method is an information communication method of an information communication system composed of: a first information processing apparatus (e.g. a local communication terminal A in FIG. 1) connected to a first network (e.g. a private network 21 in FIG. 1) and also to a second network (e.g. the Internet 1 in FIG. 1) through a first address information converting apparatus (e.g. a router 41 in FIG. 1) for converting address information (e.g. an IP address and a port number); a second information processing apparatus (e.g. a local communication terminal B in FIG. 1) connected to a third network (e.g. a private network 22 in FIG. 1) and also to the second network through a second address information converting apparatus (e.g. a router 42 in FIG. 1) for converting address information; an information management apparatus (e.g. a relay server 63 in FIG. 1) connected to the second network for managing the address information of the first information processing apparatus and the second information processing apparatus on the second network; and an address information providing apparatus (e.g. STUN servers 61 and 62 in FIG. 1) connected to the second network for providing information pertaining to the address information of the first information processing apparatus and the second information processing apparatus on the second network. The information communication method includes the steps of: judging whether or not the first address information converting apparatus has an address information informing function (e.g. UPnP™) for informing the address information of the first information processing apparatus on the second network (e.g. Step S3 in FIG. 6), obtaining the address information of the first information processing apparatus on the second network by the address information informing function to register the obtained address information in the information management apparatus in a case where the first address information converting apparatus is judged to have the address information informing function (e.g. Step S4 in FIG. 6), estimating the address information of the first information processing apparatus on the second network on the basis of the information (e.g. the port number of the NAT described in a response packet from the STUN servers 61 and 62) provided from the address information providing apparatus to register the estimated address information in the information management apparatus (e.g. the STUN module 153 in FIG. 3 for executing the process at Step S5 in FIG. 6) in a case where the first address information converting apparatus is judged not to have the address, information informing function, receiving the address information of the first or the second information processing apparatus on the second network (e.g. the CPU 201 in FIG. 5 for executing the process at Step S61 in FIG. 11), storing the received address information (e.g. the CPU 201 in FIG. 5 for executing the process at Step S612 in FIG. 11), providing the stored address information to the first or the second information processing apparatus (e.g. an exchange information providing process in FIG. 15), and obtaining the address information of the second information processing apparatus on the second network from the information management apparatus (e.g. obtains the information by the process at Step S103 in FIG. 14 or Step S163 in FIG. 17) to communicate with the second information processing apparatus.

The present invention provides an information processing apparatus is provided. The information processing apparatus is an information processing apparatus (e.g. the local communication terminal A in FIG. 1) connected to a first network (e.g. the private network 21 in FIG. 1) and also to a second network (e.g. the Internet 1 in FIG. 1) through an address information converting apparatus (e.g. the router 41 in FIG. 1) for converting address information (e.g. an IP address and a port number), the information processing apparatus including: judging means (e.g. the middleware 152 in FIG. 3 for executing the process at Step S3 in FIG. 6) for judging whether or not the address information converting apparatus has an address information informing function (e.g. UPnP™) for informing the address information of the information processing apparatus on the second network, first registering means (e.g. the UPnP module 154 in FIG. 3 for executing the process at Step S4 in FIG. 6) for obtaining the address information of the information processing apparatus on the second network by the address information informing function to register the obtained address information in an information management apparatus (e.g. the relay server 63 in FIG. 1) connected to the second network in a case where the address information converting apparatus is judged to have the address information informing function by the judging means, and second registering means (e.g. the STUN module 153 in FIG. 3 for executing the process at Step S5 in FIG. 6) for estimating the address information of the information processing apparatus on the second network on the basis of the information (e.g. the port number of the NAT described in a response packet from the STUN servers 61 and 62) provided from an address information providing apparatus (e.g. the STUN servers 61 and 62 in FIG. 1) connected to the second network for providing information pertaining to the address information of the information processing apparatus connected to the first network on the second network, and for registering the estimated address information in the information management apparatus in a case where the judging means judges that the address information converting apparatus does not have the address information informing function.

The information processing apparatus can be configured so that the first and the second registering means may include setting means (e.g. the UPnP module 154 in FIG. 3 for executing the process at Step S25 in FIG. 7 or the STUN module 153 in FIG. 3 for executing the process at Step S44 in FIG. 10) for setting identification information (e.g. a module identifier in FIG. 8) indicating whether or not the address information converting apparatus has the address information informing function, and that the identification information may further be registered in the information management apparatus.

The information processing apparatus can be configured to further include protocol judging means (e.g. the middleware 152 in FIG. 3 for executing the process at Step S82 in FIG. 13) for judging a protocol (e.g. TCP or UDP) used for communication with another information processing apparatus (e.g. any one of the local communication terminals B-D in FIG. 1) at the time of communicating with the other information processing apparatus connected to a third network (e.g. any one of the private networks 22-24 in FIG. 1) and also connected to the second network through another address information converting apparatus, TCP communication means (e.g. the middleware 152 in FIG. 3 for executing the process at Step S83 in FIG. 13) for performing TCP communication with the other information processing apparatus in a case where the protocol judging means judges that the protocol used for the communication with the other information processing apparatus is TCP, and UDP communication means (e.g. the middleware 152 in FIG. 3 for executing the process at Step S84 in FIG. 13) for performing UDP communication with the other information processing apparatus in a case where the protocol judging means judges that the protocol used for the communication with the other information processing apparatus is UDP.

The information processing apparatus can be configured so that the TCP communication means may include obtaining means (e.g. the middleware 152 in FIG. 3 for executing the process at Step S103 in FIG. 14) for obtaining the address information and the identification information of the other information processing apparatus on the second network from the information management apparatus, and connection providing means (e.g. the middleware 152 in FIG. 3 for executing the process at Step S104 in FIG. 14) for providing a TCP connection on the basis of the address information and the identification information on the second network, both pieces of information obtained by the obtaining means.

The information processing apparatus can be configured so that the connection providing means may include first identification information judging means (e.g. the middleware 152 in FIG. 3 for executing the process at Step S141 in FIG. 16) for judging whether or not the address information converting apparatus has the address information informing function on the basis of the identification information of the information processing apparatus, and second identification information judging means (e.g. the middleware 152 in FIG. 3 for executing the process at Step S142 or Step S145 in FIG. 16) for judging whether or not the other address information converting apparatus has the address information informing function on the basis of the identification information of the other information processing apparatus for enabling the provision of the TCP connection on the basis of judgment results of the first and the second identification information judging means.

The information processing apparatus can be configured in order that the UDP communication means may include obtaining means (e.g. the middleware 152 in FIG. 3 for executing the process at Step S163 in FIG. 17) for obtaining the address information and the identification information of the other information processing apparatus on the second network from the information management apparatus, and communication preparing means (e.g. the middleware 152 in FIG. 3 for executing the process at Step S164 in FIG. 16) for preparing the UDP communication on the basis of the address information and the identification information on the second network, both pieces of information obtained by the obtaining means.

The information processing apparatus can be configured so that the communication preparing means may include first identification information judging means (e.g. the middleware 152 in FIG. 3 for executing the process at Step S183 in FIG. 18) for judging whether or not the address information converting apparatus has the address information informing function on the basis of the identification information of the information processing apparatus, and second identification information judging means (Step S181 in FIG. 18) for judging whether or not the other address information converting apparatus has the address information informing function on the basis of the identification information of the other information processing apparatus, and that the communication preparing means may prepare the UDP communication on the basis of judgment results of the first or the second identification information judging means.

The present invention provides an information processing method. The information processing method is an information processing method of an information processing apparatus (e.g. the local communication terminal A in FIG. 1) connected to a first network (e.g. the private network 21 in FIG. 1) and also connected to a second network (e.g. the Internet 1 in FIG. 1) through an address information converting apparatus (e.g. the router 41 in FIG. 1) for converting address information (e.g. an IP address and a port number), the information processing method including: a judging step (e.g. Step S3 in FIG. 6) of judging whether or not the address information converting apparatus has an address information informing function (e.g. UPnP) for informing the address information of the information processing apparatus on the second network, a first registering step (e.g. Step S4 in FIG. 6) of obtaining the address information of the information processing apparatus on the second network by the address information informing function to register the obtained address information in an information management apparatus (e.g. the relay server 63 in FIG. 1) connected to the second network in a case where the address information converting apparatus is judged to have the address information informing function by the process of the judging step, and a second registering step (e.g. Step S5 in FIG. 6) of estimating the address information of the information processing apparatus on the second network on the basis of the information (e.g. the port number of the NAT described in a response packet from the STUN servers 61 and 62) provided from an address information providing apparatus connected to the second network for providing information pertaining to the address information of the information processing apparatus connected to the first network on the second network, and of registering the estimated address information in the information management apparatus in a case where the address information converting apparatus is judged not to have the address information informing function by the process of the judging step.

The present invention provides a program. The program is a program of an information processing apparatus (e.g. the local communication terminal A in FIG. 1) connected to a first network (e.g. the private network 21 in FIG. 1) and also connected to a second network (e.g. the Internet 1 in FIG. 1) through an address information converting apparatus (e.g. the router 41 in FIG. 1) for converting address information (e.g. an IP address and a port number), the program makes a computer execute: a judgment controlling step (e.g. Step S3 in FIG. 6) of controlling the judgment of whether or not the address information converting apparatus has an address information informing function (e.g. UPnP™) for informing the address information of the information processing apparatus on the second network, a first registration controlling step (e.g. Step S4 in FIG. 6) of performing control to obtain the address information of the information processing apparatus on the second network by the address information informing function to register the obtained address information in an information management apparatus (e.g. the relay server 63 in FIG. 1) connected to the second network in a case where the address information converting apparatus is judged to have the address information informing function by the process of the judgment controlling step, and a second registration controlling step (e.g. Step S5 in FIG. 6) of performing control to estimate the address information of the information processing apparatus on the second network on the basis of the information (e.g. the port number of the NAT described in a response packet from the STUN servers 61 and 62) provided from an address information providing apparatus (e.g. the STUN servers 61 and 62 in FIG. 1) connected to the second network for providing information pertaining to the address information of the information processing apparatus connected to the first network on the second network, and to register the estimated address information in the information management apparatus when the address information converting apparatus is judged not to have the address information informing function by the process of the judgment controlling step.

The present invention provides a recording medium. The recording medium is a recording medium on which a program of an information processing apparatus (e.g. the local communication terminal A in FIG. 1) is recorded, the information processing apparatus connected to a first network (e.g. the private network 21 in FIG. 1) and also connected to a second network (e.g. the Internet 1 in FIG. 1) through an address information converting apparatus (e.g. the router 41 in FIG. 1) for converting address information (e.g. an IP address and a port number), the recording medium records the program which makes a computer execute: a judgment controlling step (e.g. Step S3 in FIG. 6) of controlling the judgment of whether or not the address information converting apparatus has an address information informing function (e.g. UPnP™) for informing the address information of the information processing apparatus on the second network, a first registration controlling step (e.g. Step S4 in FIG. 6) of performing control to obtain the address information of the information processing apparatus on the second network by the address information informing function to register the obtained address information in an information management apparatus (e.g. the relay server 63 in FIG. 1) connected to the second network in a case where the address information converting apparatus is judged to have the address information informing function by the process of the judgment controlling step, and a second registration controlling step (e.g. Step S5 in FIG. 6) of performing control to estimate the address information of the information processing apparatus on the second network on the basis of the information (e.g. the port number of the NAT described in a response packet from the STUN servers 61 and 62) provided from an address information providing apparatus (e.g. the STUN servers 61 and 62 in FIG. 1) connected to the second network for providing information pertaining to the address information of the information processing apparatus connected to the first network on the second network, and to register the estimated address information in the information management apparatus in a case where the address information converting apparatus is judged not to have the address information informing function by the process of the judgment controlling step.

In the following the attached drawings are referred to while the embodiments of the present invention are described. FIG. 1 is a block diagram showing a configuration example of an information communication system to which the present invention is applied. In the figure, routers 41-44 including a NAT (or NAPT) function are connected to the Internet 1. The routers 41-44 severally include private networks 21-24 as their owns subordinates. A private address effective only within each network is severally assigned to each of local communication terminals A-D connected to the private networks 21-24, respectively, in accordance with the address system of the private networks 21-24.

The local communication terminals A-D executes an application such as a video chat and an online game in accordance with a command from a user, and perform communication with other communication equipment connected to the network. In a case where the local communication terminals A-D perform communication through the Internet 1 by their NAT functions, the routers 41-44 convert the IP addresses (private addresses) and the port numbers in the private networks 21-24, which are attached to the packets which will be transmitted from the local communication terminals A-D to the Internet 1, to the IP addresses (global addresses) in the Internet 1 and the port numbers set in accordance with a predetermined algorithm, respectively, to transfer the converted IP addresses and the port numbers to the Internet 1. At this time, a table relating the private addresses and the port numbers, which have been assigned to the local communication terminals A-D, to the global addresses and the port numbers, which have been converted by means of the NAT functions, respectively, is stored in the routers 41-44.

Moreover, the routers 41-44 refer to the above-mentioned table to convert the IP addresses (global addresses) and the port numbers, which are attached to the packets received from the Internet 1 to the private addresses and the port numbers, which have been assigned to the local communication terminals A-D, respectively, by means of the NAT functions. Then, the routers 41-44 transfer the converted private addresses and the port numbers to the private networks 21-24, respectively.

Now, the global addresses converted by means of the NAT functions of the routers 41-44 are global addresses assigned to interfaces 41-1 to 44-1, through which the routers 41-44 are connected to the Internet 1, respectively. Moreover, the port numbers are selected and converted in accordance with the respective algorithms installed in the routers 41-44.

For example, when the local communication terminal A communicates with communication equipment (e.g. a STUN server 61) connected to the Internet 1, the local communication terminal A transmits a packet to the communication equipment. At this time, when the router 41 transfers the packet transmitted by the local communication terminal A to the Internet 1, the router 41 converts the transmission source address of the packet to be transferred from the private address (e.g. "aaa.aaa.aaa.aaa") assigned to the local communication terminal A to a global address (e.g. "qqq.qqq.qqq.qqq") assigned to the interface 41-1. Moreover, the router 41 converts the port number (for example, "3000") of the transmission source of a packet to be transferred to a port number (for example, "3010") which is not currently used by the router 41.

Then, in a case where the local communication terminal A communicates with other communication equipment (e.g. the STUN server 62) connected to the Internet 1, the router 41 transfers a packet transmitted by the local communication terminal A to the Internet 1. At this time, the address of the transmission source of the packet to be transferred is similarly converted to a global address, but as the port number of the transmission source, a value produced by adding "1" to the port number ("3010") used at the last time is selected and is converted (the port number of the transmission source is converted to "3011" in this case).

As described above, when the local terminal A communicates with communication equipment connected to the Internet 1, the router 41 increases the port number to the communication equipment one by one. That is to say, the NAT function of the router 41 includes a function of incrementing the port number by one when the transmission destination (communication partner) is changed.

Moreover, for example, in a case where the local communication terminal B communicates with communication equipment (e.g. the STUN server 61) connected to the Internet 1, the local communication terminal B transmits a packet to the communication equipment. At this time, the router 42 transfers a packet transmitted by the local communication terminal B to the Internet 1. The router 42 converts the transmission source address of the packet to be transferred from the private address (e.g., "bbb.bbb.bbb.bbb") assigned to the local communication terminal B to the global address (e.g., "rrr.rrr.rrr.rrr") assigned to the interface 42-1. Moreover, the router 42 converts the port number (e.g. "3000") of the transmission source of a packet to be transferred to a port number (e.g. "3020") which is not currently used by the router 42.

In a case where the local communication terminal B communicates with other communication equipment (e.g. the STUN server 62) connected to the Internet 1, the router 42 transfers a packet transmitted by the local communication terminal B to the Internet 1. At this time, the router 42 similarly converts the transmission source address of the packet to be transferred to a global address, and selects the same value as that of the port number of the transmission source which has used at the last time, and converts the port number to the selected value (the port number of the transmission source is converted to "3020", too, in this case).

As described above, the router 42 has an algorithm different from that of the router 41. Even if the transmission destination (communication partner) is changed, the router 42 does not increment the port number.

Both the router 43 and the router 44 similarly convert the transmission source address and the port number of a packet to be transferred to the Internet 1. For example, the router 43 has a function (algorithm) of incrementing the port number by two when the transmission destination (communication partner) is changed. For example, when the transmission destination (communication partner) is changed, the router 44 has a function (algorithm) of incrementing the port number by ten.

As described above, the routers 41-44 converts the port numbers in accordance with respective algorithms installed in the respective routers 41-44.

Moreover, the router 41 and the router 43 have the UPnP™ function installed. When the routers 41 and 43 receive a predetermined request packet based on the UPnP™ protocol from the local communication terminal A or the local communication terminal C, the routers 41 and 43 severally inform the local communication terminal A or the local communication terminal C of the global addresses and the port numbers, both converted by the NAT functions of the routers 41 and 43. On the other hand, the routers 42 and 44 do not have the UPnP™ function installed.

Moreover, the STUN servers 61 and 62, and a relay server 63 are connected to the Internet 1.

The STUN servers 61 and 62 store the transmission source address and the transmission source port number of a packet received through the Internet 1 in accordance with the Simple Traversal of UDP through NATs (STUN) protocol, and transmits the stored transmission source address and the transmission source port number in response to a request.

The local communication terminals A-D have previously stored the global addresses of the STUN servers 61 and 62. By transmitting a predetermined request packet defined by the protocol of STUN to the STUN server 61 or 62, the local communication terminals A-D can obtain the information indicating how their own addresses and port numbers have been converted by the NAT functions of the routers 41-44.

The relay server 63 is one for supporting that the local communication terminals A-D connected to the private networks 21-24, respectively, severally perform a peer to peer (P2P) communication by the NAT traversal. Moreover, the relay server 63 provides, for example, an instant message service (hereinafter referred to as "IM service"). That is to say, the relay server 63 authenticates a previously registered user (terminal), and accepts accesses from the local communication terminals A-D. The local communication terminals A-D transmit global addresses and port numbers, which are converted in accordance with the NAT and are obtained by means of the function of STUN or UPnP™, to the relay server 63. The relay server 63 stores the global addresses and the port numbers transmitted from the local communication terminals A-D, and transmits the stored global addresses and the port numbers to the local communication terminals A-D in response to a request from the local communication terminals A-D.

Consequently, the local communication terminals A-D can obtain the global address (IP address) and the port number of a communication partner to perform P2P communication.

Incidentally, although a single local communication terminal is connected to each of the private networks 21-24 in this example, two or more local communication terminals are actually connected.

FIG. 2 is a block diagram showing a configuration example of the local communication terminal A (so with the local communication terminals B-D). In the figure, a central processing unit (CPU) 101 executes various processes in accordance with a program stored in a read only memory (ROM) 102 or a program loaded in a random access memory (RAM) 103 from a storage unit 108. Data and the like necessary for the CPU 101 to execute various processes are suitably stored in the RAM 103.

The CPU 101, the ROM 102 and the RAM 103 are mutually connected through a bus 104. An input/output interface 105 is also connected to the bus 104.

The input/output interface 105 is connected with an input unit 106 composed of a keyboard, a mouse and the like; an output unit 107 composed of a display (display unit) including a cathode ray tube (CRT), a liquid crystal display (LCD) or the like, a speaker and the like; the storage unit 108 composed of a hard disk or the like; and a communication unit 109 composed of a modem, a terminal adapter or the like. The communication unit 109 performs a communication process through a network such as the Internet 1.

The input/output interface 105 is also connected to a drive 110 as occasion demands. For example, a removable medium 111 is mounted in the drive 110 as a recording medium in which a program is recorded. A computer program read from the removable medium 111 is installed in the storage unit 108 as occasion demands.

FIG. 3 is a block diagram showing a configuration example of software 131 installed in the local communication terminals A-D. In this example, the software 131 is composed of an application 151, middleware 152, a STUN module 153, an UPnP module 154 and a control module 155.

The application 151 provides an application such as a video chat and an online game in accordance with a command of a user. The STUN module 153 executes a predetermined operation on the basis of the STUN protocol, and obtains the information of a global address and a port number, both converted by the NAT functions of the routers 41-44. The UPnP module 154 executes a predetermined operation on the basis of the UPnP™ protocol to judge whether or not the routers 41-44 have the UPnP™ function installed. Also, in a case where the router has the UPnP™ function installed, the UPnP module 154 obtains the information of the global address and the port number, both converted by the NAT function.

The middleware 152 controls the STUN module 153 or the UPnP module 154 in accordance with a request from the application 152, and provides P2P communication.

The control module 155 controls each unit such as the communication unit 109 and the drive 110 in accordance with a request from the application 151, the middleware 152, the STUN module 153 or the UPnP module 154.

Figure 4:
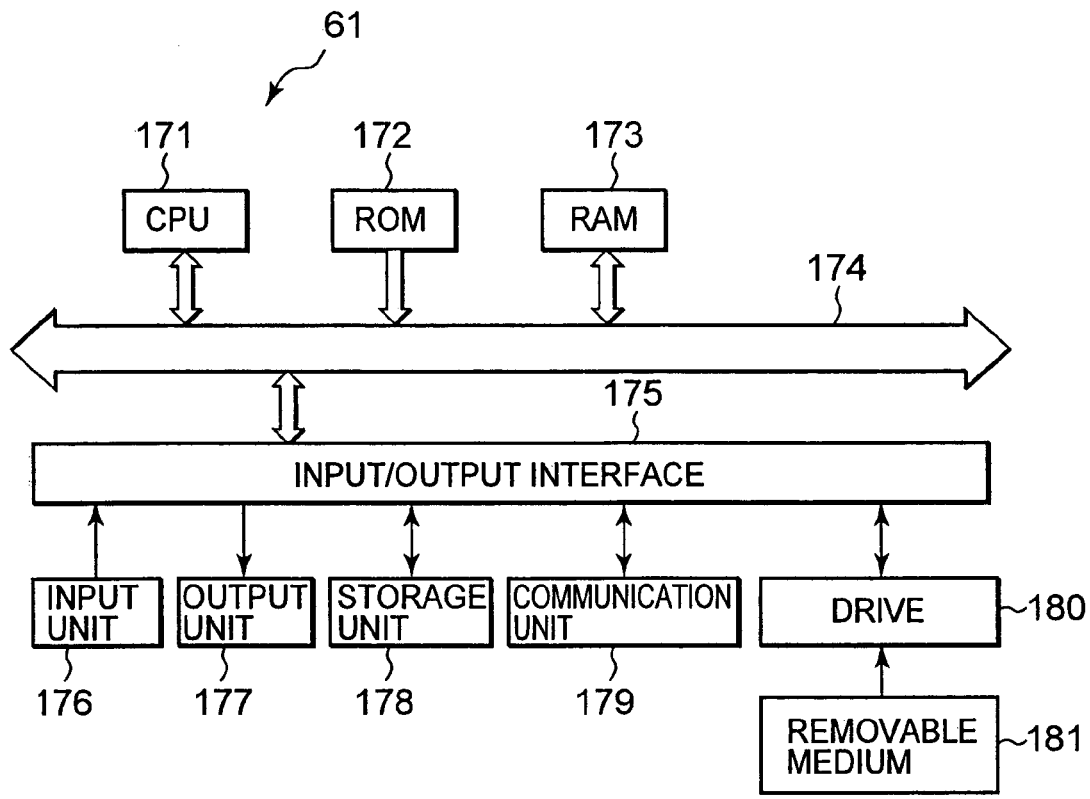
FIG. 4 is a block diagram showing a configuration example of a STUN server shown in FIG. 1.

FIG. 4 is a block diagram showing a configuration example of the STUN server 61 (so with the STUN server 62). In the figure, because a CPU 171 to a removable medium 181 is similar to the CPU 101 to the removable medium 111 of FIG. 2, respectively, their description is omitted.

Figure 5:
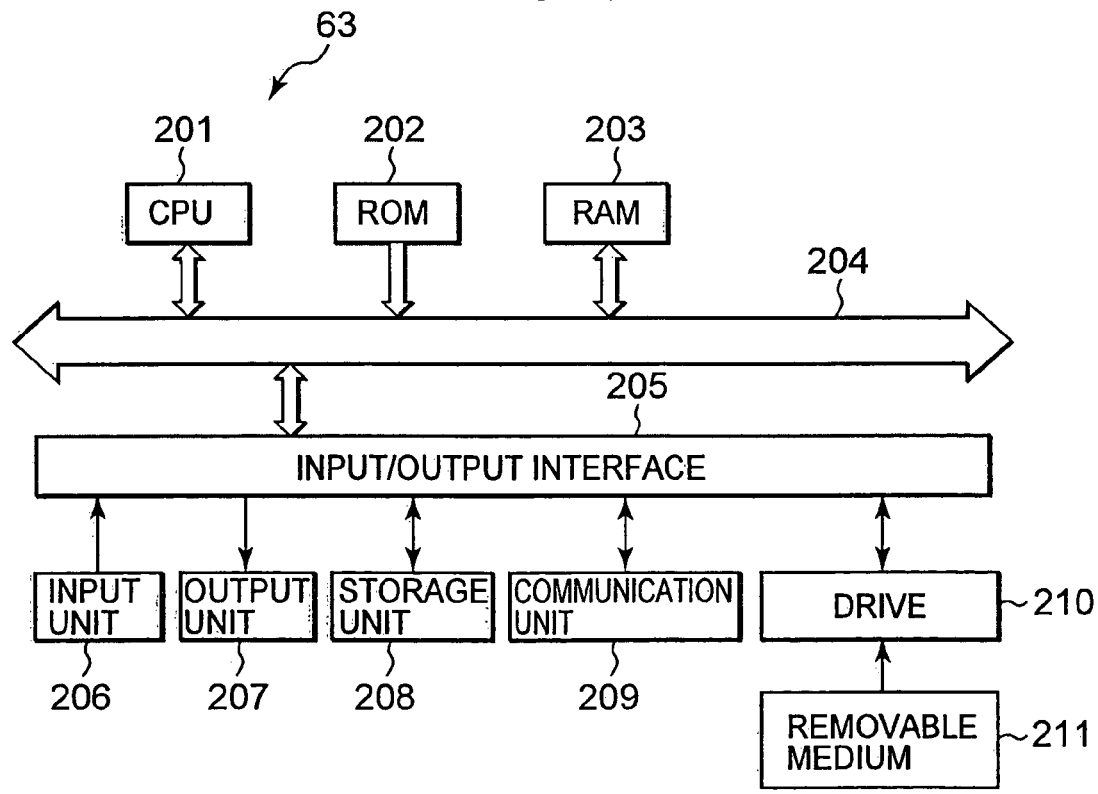
FIG. 5 is a block diagram showing a configuration example of a relay server shown in FIG. 1.

FIG. 5 is a block diagram showing a configuration example of the relay server 63. In the figure, because a CPU 201 to a removable medium 211 is also similar to the CPU 101 to the removable medium 111 of FIG. 2, respectively, their description is omitted.

Figure 6:
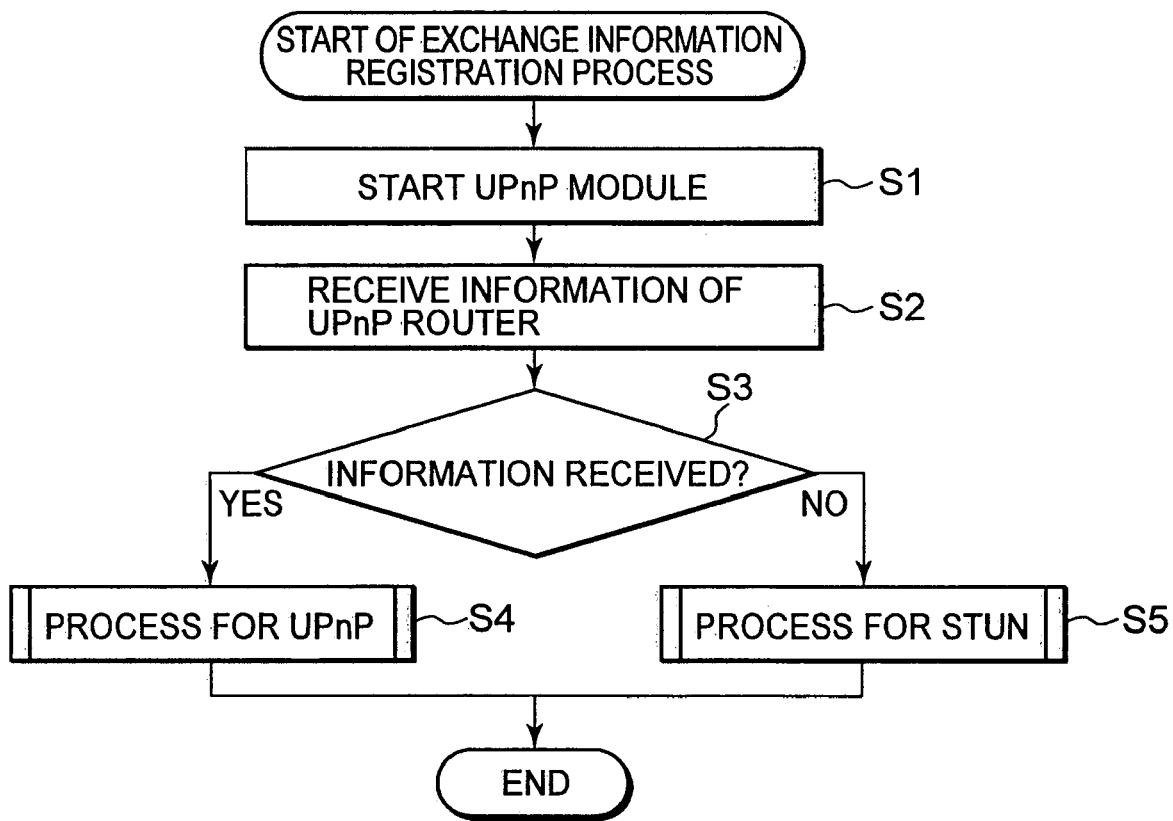
FIG. 6 is a flowchart for explaining an exchange information registration process.

Next, the flowchart of FIG. 6 is referred to while an exchange information registration process for registering a global address and a port number, which the local communication terminal A has obtained by using the function of UPnP™ or STUN and are to be converted by the NAT, as exchange information in the relay server 63 is described. The process may be commanded to be executed by, for example, an operation of a keyboard, a mouse or the like (not shown) constituting the input unit 106 by a user, or may be automatically executed before the execution of an application for performing a P2P communication such as a video chat at the time of the execution of the application.

At Step S1, the middleware 152 starts the UPnP module 154. The UPnP module 154 transmits a predetermined packet defined by the UPnP™ to a router (the router 41 in this case) connecting the private network (the private network 21 in this case) to which the UPnP module 154 itself is connected to the Internet 1. Thereby, the UPnP module 154 checks whether or not the router, to which the UPnP module 154 itself is connected, has the UPnP™ function (the details of the protocol of UPnP is described in a website of the UPnP™ forum ("http://www.upnp.org")).

At Step S2, the middleware 152 receives the information from a UPnP™ router through the communication unit 109. In the UPnP™ protocol, a protocol called as Simple Service Discovery Protocol (SSDP) is used for finding out other UPnP™ equipment existing in the private network 21. In this protocol, equipment having the UPnP™ function generates a packet describing its own information by means of the extensible markup language (XML), and transmits the generated packet to other equipment in the network (private network 21) to which the equipment is connected. Because the device type of the XML announced by SSDP is set as "Internet gateway device (meaning the NAT by the terminology of UPnP™) in the NAT (router 41) having the UPnP™ function, the local communication terminal A can judge whether or not the local communication terminal A itself is located at a subordinate of the NAT having the UPnP™ function on the basis of the information. Incidentally, in a case where the router 41 does not have the UPnP™ function installed, the information is not received.

At Step S3, the middleware 152 judges whether or not the information from the UPnP™ router has been received. As described above, in the case where the router 41 has the UPnP™ function installed, the information from the router 41 is received at the process of Step S2. Consequently, the process advances to Step S4. At Step S4, the middleware 152 makes the UPnP module 154 execute a process for UPnP™, which will be described later by referring to FIG. 7. Thereby, the port number converted by the NAT function is specified by the UPnP™ function, and the global address and the port number are transmitted to the relay server 63.

On the other hand, in a case where no information has been received from the router after the lapse of a predetermined time (the case where the router 41 does not have the UPnP™ function installed), at Step S3, it is judged that no information has been received, and the process advances to Step S5. The middleware 152 makes the STUN module 153 execute a process for STUN, which will be described later by referring to FIG. 10. Consequently, the global address and the port number, both converted by the NAT function, are specified by the STUN function, and are transmitted to the relay server 63.

Figure 7:
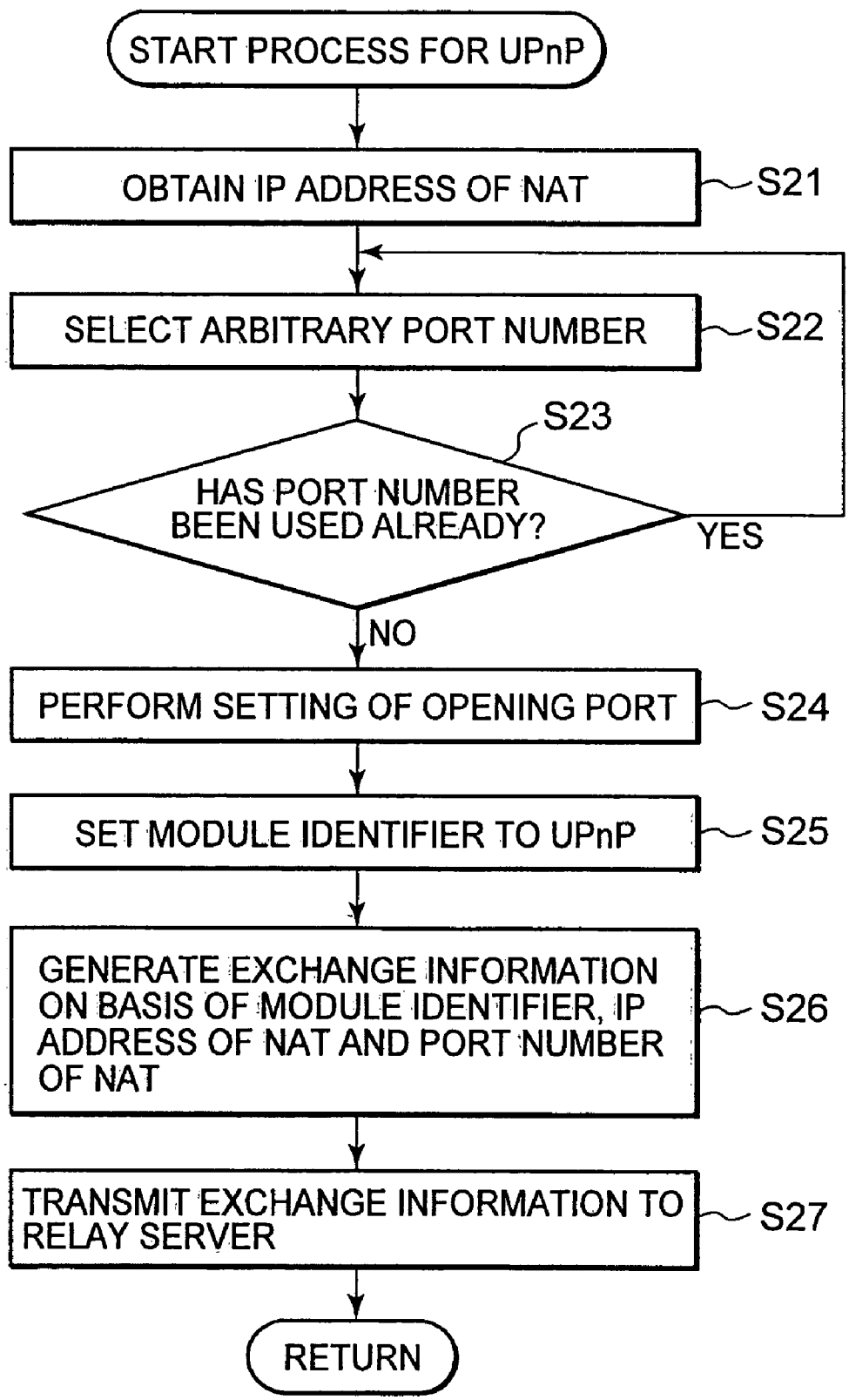
FIG. 7 is a flowchart for explaining a process for UPnP™.

Next, FIG. 7 is referred to while the details of the process for UPnP™ at Step S4 of FIG. 6 are described.

At Step S21, the UPnP module 154 obtains the IP address of the NAT. At this time, for example, a series of operations defined by the UPnP™ protocol, which is called as "Get External IP Address", is executed. Consequently, in the case where the router 41 has the UPnP™ function installed, a global address (the global address of the interface 41-1 in this case) converted by the NAT function is transmitted to the local communication terminal A as a response from the router 41.

At Step S22, the UPnP module 154 selects an arbitrary port number, and executes a series of operations defined by the UPnP™ protocol, which operations are called as "Get Specific Port Mapping Entry". Consequently, the router 41 checks whether or not the port number selected at Step S22 has been already used. The result of the checking is responded from the router 41 to the local communication terminal A.

At Step S23, the UPnP module 154 judges whether or not the port number has been already used in the router 41 on the basis of the response from the router 41. In a case where the UPnP module 154 judges that the port number has been already used, the process returns to Step S22. Then, the UPnP module 154 newly selects a port number. In such a way, the above-mentioned processes are repeatedly executed until a port number which has not been already used is selected.

On the other hand, in a case where the UPnP module 154 judges at Step S23 that the port number selected at Step S22 is not used by the router 41, the process of the UPnP module 154 advances to Step S24. The UPnP module 154 executes a series of operations defined by the UPnP™ protocol, which operations are called as "Add Port Mapping", and performs the setting of opening a port. Thereby, the router 41 relates the port number (e.g. "3010"), which has been selected at Step S22 and has been judged at Step S23 not to be used, to the private address of the local communication terminal A, and stores the port number and the private address as a table. After that, in a case where the router 41 receives a packet in which the port number of a transmission destination is set as "3010" from the Internet 1, the router 441 transfers the packet to the local communication terminal A.

At Step S25, the UPnP module 154 sets a module identifier indicating whether or not the router 41 has the UPnP™ function installed to "UPnP", and stores the module identifier in the RAM 103.

At Step S26, the UPnP module 154 generates a piece of exchange information on the basis of the module identifier set at Step S25, the NAT global address (IP address) obtained at Step S21, and the port number (NAT port number), the opening of which is set at Step S24.

A configuration example of the exchange information generated at that time is shown in FIG. 8. In the figure, the names of the items constituting the exchange information, and the attributes of the values set to the respective items (item values) are shown. The item "IP" is the above-mentioned IP address (global address) of the NAT. The item "IP" is described by expressing a bit value (binary number) of each segment by a decimal number which segment is produced by the division of an IP address of 32 bits to four segments, each composed of 8 bits.

The item "PORT" is the above-mentioned port number of the NAT. For example, "3010" is described as the item "PORT".

The item "PROTOCOL" designate a communication in accordance with either the transmission control protocol (TCP) or the user datagram protocol (UDP). An item value of either "TCP" or "UDP" is described correspondingly to a designation by a user. Incidentally, the item "PROTOCOL" may be omitted.

The item "MODULE" is an item corresponding to the above-mentioned module identifier. "UPnP" or "STUN" is described correspondingly to the processed module as the item value. Because the process is one by the UPnP module 154 in this case, "UPnP" is described.

FIG. 9 is a figure showing an example of the exchange information to be actually generated. In the figure, each of the above-mentioned item is described by referring to FIG. 8. An item value is described by "=" succeeding to the item. Then, the block of each item and its item value is connected with each other by "&", and thereby the exchange information is configured. That is to say, in a case of the example of FIG. 9, "IP", "PORT", "PROTOCOL" and "MODULE" are set to be "127.0.0.1", "3010", "TCP" and "UPnP", respectively.

Returning to FIG. 7, at Step S27, the UPnP module 154 transmits the exchange information which has been produced at Step S26 and is shown in FIG. 9 to the relay server 63.

Figure 10:
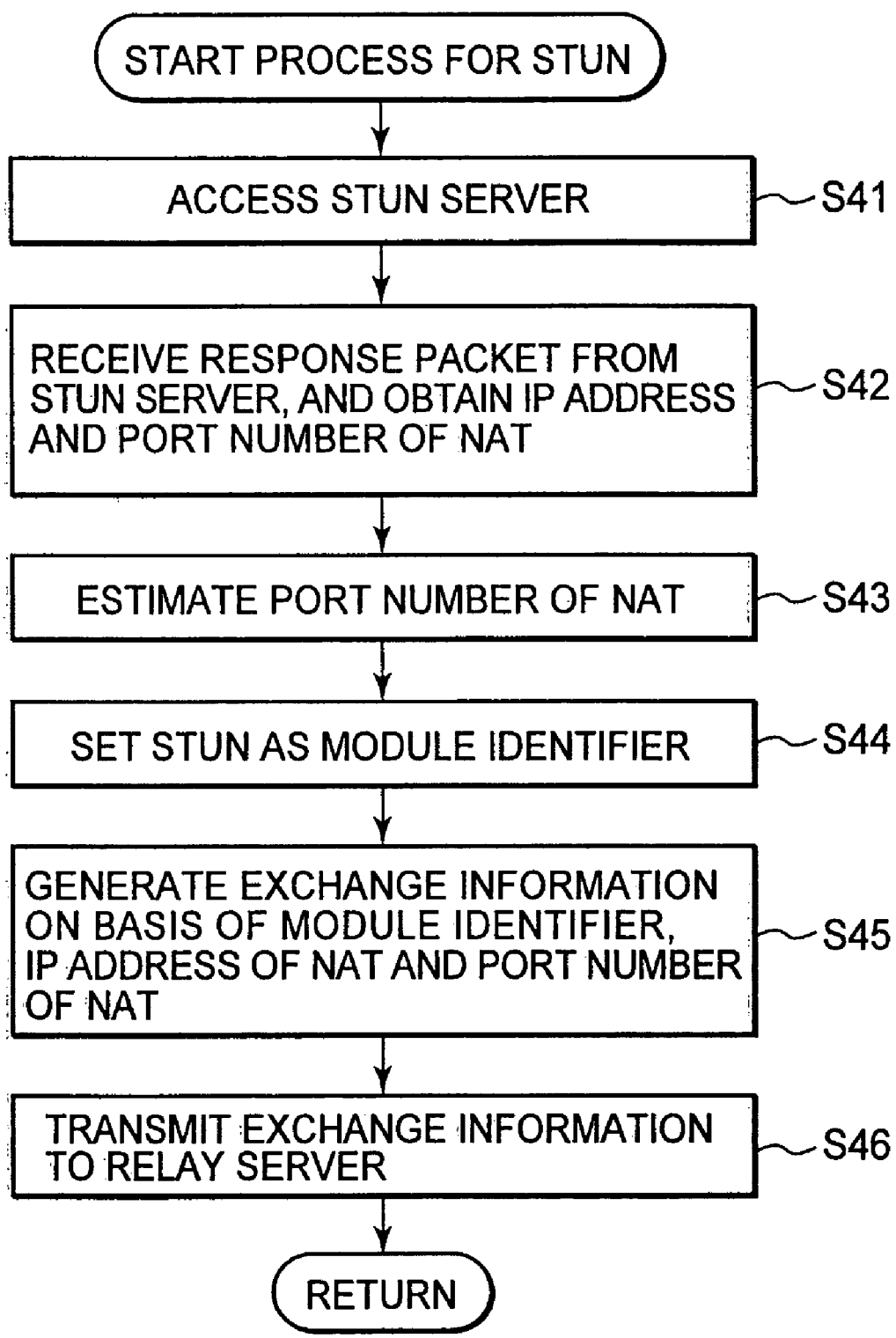
FIG. 10 is a flowchart for explaining a process for STUN.

Next, FIG. 10 is referred to while the details of a process for STUN at Step S5 of FIG. 6 are described.

At Step S41, the STUN module 153 accesses the STUN servers 61 and 62 to request the obtaining of the IP address and the port number of the NAT. Thereby, a packet transmitted from the local communication terminal A is obtained by the STUN servers 61 and 62. The transmission source address and the transmission source port number of the packet are set to the global address and the port number (the IP address and the port number of the NAT), which are converted by the router 41.

For example, when the router 41 transfers the packet to the STUN server 61, the router 41 converts the transmission source address of the packet from the private address (e.g. "aaa.aaa.aaa.aaa") assigned to the local communication terminal A to the global address (e.g. "qqq.qqq.qqq.qqq") assigned to the interface 41-1. Then, the router 41 converts the transmission source port number (e.g. "3000") of the packet to, for example, "3010". Moreover, when the router 41 transfers a packet to, for example, the STUN server 62, the router 41 converts the transmission source address of the packet to a global address similarly, and converts the transmission source port number to "3011".

Then, when the STUN servers 61 and 62 receive a request from the local communication terminal A, the STUN servers 61 and 62 severally generate a packet describing the transmission source address and the transmission source port number (the IP address and the port number of the NAT) of the obtained packet in the payload part of the packet, and transmits the generated packet to the local communication terminal A as a response packet.

At Step S42, the STUN module 153 receives the response packets transmitted from each of the STUN servers 61 and 62, and obtains the IP address and the port number of the NAT of each of the response packets.

At Step S43, the STUN module 153 estimates the port number of the NAT to be used at the next time on the basis of the port number described in each of the response packets. At this time, the estimation of the port number of the NAT is performed, for example, as follows.

The port number of the NAT is described as "3010" in the response packet received from the STUN server 61 at Step S42. The port number of the NAT is described as "3011" in the response packet received from the STUN server 62. Now, the STUN module 153 calculates the difference between the two port numbers (3011−3010=1), and thereby the STUN module 153 recognizes that the NAT function of the router 41 includes a function of incrementing the port number by one when the transmission destination (communication partner) is changed. Then, the STUN module 153 adds the above-mentioned difference of the port number to the port number of the packet transmitted at the last time (the packet transmitted by the STUN server 62 in this case), and estimates the port number of the NAT to be used at the next time. In this case, the port number of the NAT to be used at the next time is estimated to "3012 (=3011+1)".

At Step S44, the STUN module 153 sets the above-mentioned module identifier to "STUN", and stores the set module identifier to the RAM 103.

At Step S45, the STUN module 153 generates the above-mentioned exchange information on the basis of the module identifier set at Step S44, the global address (IP address) of the NAT obtained at Step S42, and the port number of the NAT estimated at Step S43.

At Step S46, the STUN module 153 transmits the exchange information generated at Step S45 to the relay server 63.

In this way, the global address and the port number, both converted by the NAT, (the IP address and the port number of the NAT) are registered in the relay server 63 as the exchange information. In the case where the router 41 has the function of UPnP™, the IP address and the port number of the NAT are obtained on the basis of the protocol of UPnP™. In the case where the router 41 does not have the function of UPnP™, the IP address and the port number of the NAT are obtained on the basis of the protocol of STUN. Consequently, the exchange information can be generated regardless of the function of the router 41.

Moreover, the opening of the port number of the NAT to be used by the router 41 is set (the port number is preengaged) in the case of UPnP™. In a case of STUN, the port of the NAT to be used by the router 41 next is not preengaged, but is estimated. Consequently, the port number of the NAT can be more surely obtained in the case of UPnP™. In the above-mentioned example (FIG. 6), it is first judged whether or not the router 41 has the function of UPnP™ (Step S3 in FIG. 6). In the case where the router 41 has the function of UPnP™, the IP address and the port number of the NAT is obtained on the basis of the protocol of UPnP™. In the case where the router 41 does not has the function of UPnP™, the IP address and the port number of the NAT is obtained on the basis of the protocol of STUN. As a result, the surer IP address and the port number of the NAT can be obtained.

Incidentally, in this example, an example of the process in which the local communication terminal A registers exchange information in the relay server 63 has been described. Also in the local communication terminals B-D, exchange information is suitably registered in the relay server 63 by similar processes.

Figures 11, 12:
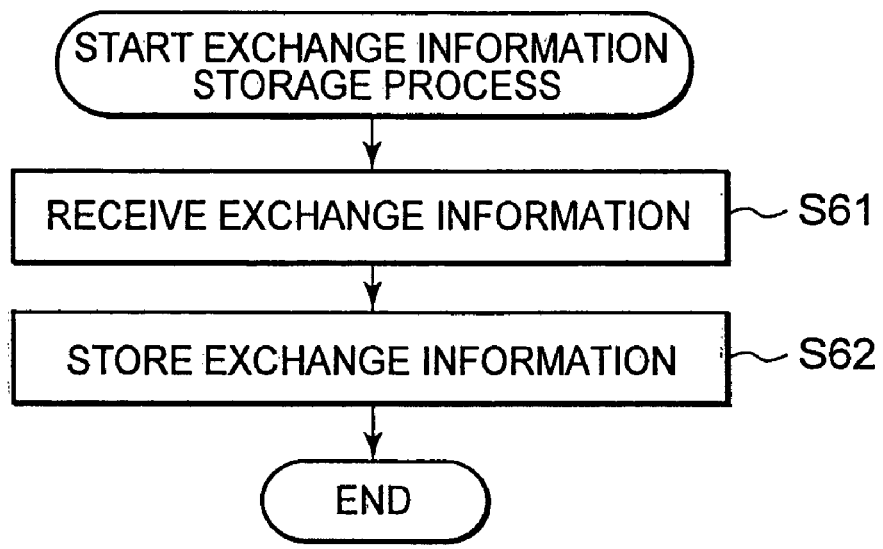
FIG. 11 is a flowchart for explaining an exchange information storage process.
FIG. 12 is a view showing an example of the exchange information stored in the relay server.

Next, the flowchart of FIG. 11 is referred to while the storage process of exchange information in the relay server 63 is described.

At Step S61, the CPU 201 of the relay server 63 receives exchange information transmitted from the local communication terminals A-D through a communication unit 209. Then, at Step S62, the CPU 201 stores the exchange information received at Step S61 in a storage unit 208.

Thereby, in the storage unit 208 of the relay server 63, the exchange information as shown in FIG. 12 is stored. In the figure, as the items of the information to be stored, "terminal ID", "IP address", "port number" and "module" are shown. Besides, "protocol" (the information indicating TCP or UDP) and the like may be stored.

The "IP address" is the above-mentioned IP address of the NAT, and describes the global addresses of the routers 41-44 to which the local communication terminals A-D are connected. The "module" is an item corresponding to the above-mentioned module identifier. Because the routers 41 and 43 have the function of the UPnP™, the modules of the terminals A and C are described as "UPnP". Because the router 42 and 44 do not have the function of the UPnP™, the modules of the terminals B and C are described as "STUN". The "port number" is the above-mentioned port number of the NAT. The "port numbers" of the local communication terminals A and C are ones to which opening is set by the function of UPnP™. The "port numbers" of the local communication terminals B and D are ones estimated by the function of STUN.

In this way, the exchange information is stored in the relay server 63. In a case where the local communication terminals A-D perform communication with the other local communication terminals, the local communication terminals A-D can perform P2P communication which has performed the NAT traversal by obtaining the exchange information of the communication partners from the relay server 63.

Figure 13:
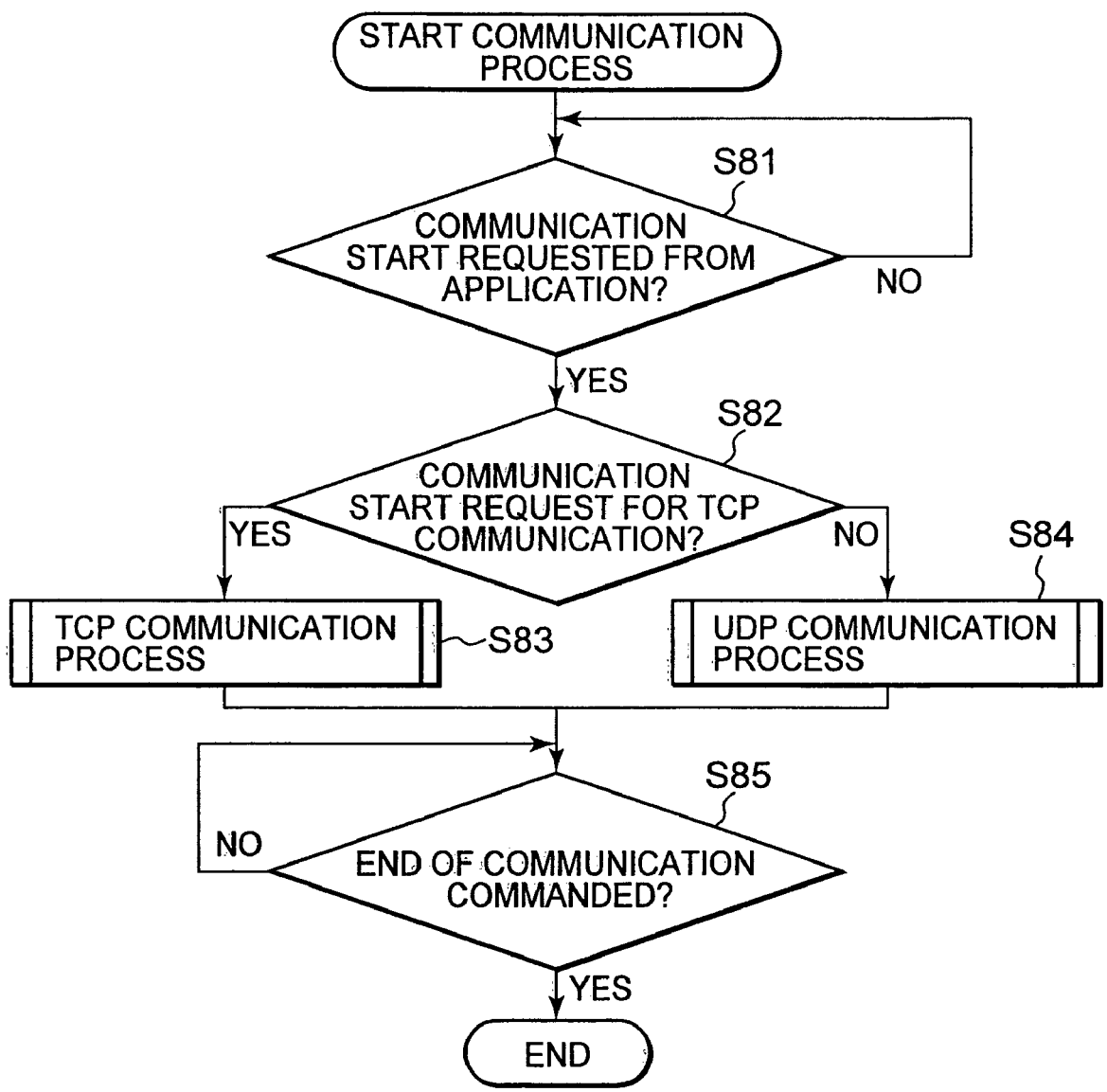
FIG. 13 is a flowchart for explaining a communication process.

Next, the flowchart of FIG. 13 is referred to while the communication process of each of the local communication terminals A-D is described. The process is executed when an application for performing P2P communication is started in each of the local communication terminals A-D.

At Step S81, the middleware 152 judges whether or not a communication start request is issued from the application 151. The middleware 152 stands by until it can judge that the communication start request has issued. Then, in a case where it is judged that the communication start request has issued, the process advances to Step S82. At this time, the application 151 informs the middleware 152 of the information of the information of the communication partner and the kind of the communication (for example, whether or not the communication is TCP communication).

At Step S82, the middleware 152 judges whether or not the communication start request from the application 151 is a communication start request of the TCP communication. In a case where the middleware 152 judges that the communication start request is the communication start request of the TCP communication, the process of the middleware 152 advances to Step S83, and the middleware 152 executes the TCP communication process, which will be described later by referring to FIG. 14. On the other hand, in a case where the middleware 152 judges that the communication start request from the application 151 is not the communication start request of the TCP communication at Step S82, the process of the middleware 152 advances to Step S84, and executes a UDP communication process, which will be described later by referring to FIG. 17.

After the process at Step S83 or S84, the process advances to Step S85, and the control module 155 judges whether or not the end of the communication is commanded. The control module 155 stands by until it is judged that the end of the communication is commanded. At Step S85, in a case where it is judged that the end of the communication is commanded, the process ends.

Figure 14:
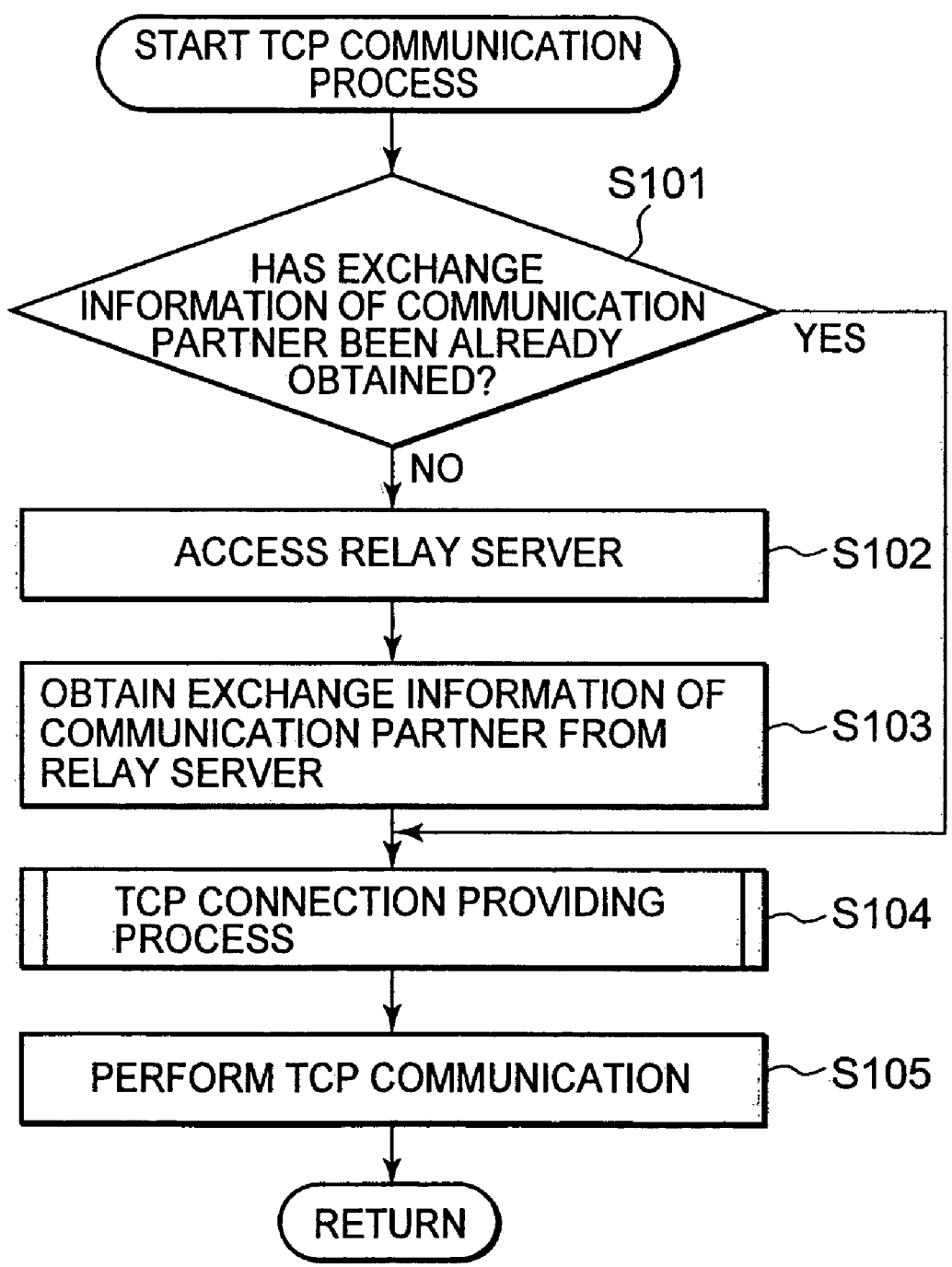
FIG. 14 is a flowchart for explaining a TCP communication process.

Next, the flowchart of FIG. 14 is referred to while the details of the TCP communication process at Step S83 in FIG. 13 are described.

At Step S101, the middleware 152 judges whether or not the exchange information of the communication partner has already been obtained. In a case where it is judged that the exchange information of the communication partner has not been obtained yet, the process of the middleware 152 advances to Step S102.

At Step S102, the middleware 152 accesses the relay server 63 to transmit an obtaining request of the exchange information. The obtaining request of the exchange information transmitted at this time includes the terminal ID of the communication partner and the information of the kind of the communication indicating that the communication is the TCP communication. The relay server 63, which has received the obtaining request of the exchange information, executes the exchange information providing process, which will be described later by referring to FIG. 15.

Figure 15:
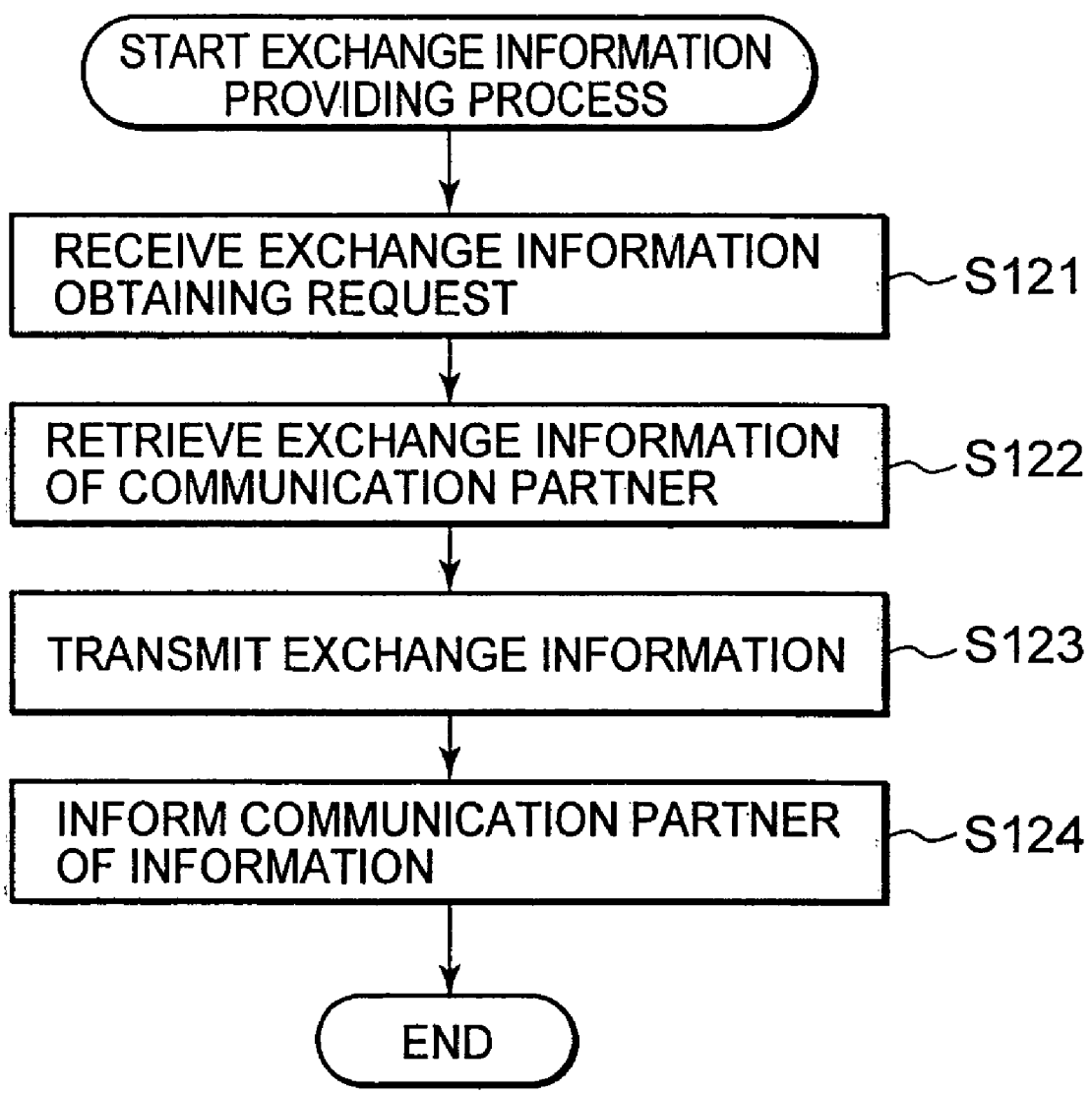
FIG. 15 is a flowchart for explaining an exchange information providing process.

Now, the flowchart of FIG. 15 is referred to while the exchange information providing process of the relay server 63 is described. At Step S121, the CPU 201 of the relay server 63 receives the obtaining request of the exchange information, which has been transmitted from any of the local communication terminals A-D, through the communication unit 209.

At Step S122, the CPU 201 retrieves the exchange information corresponding to the terminal ID of the communication partner included in the obtaining request of the exchange information received at Step S121 from the exchange information stored in the storage unit 208. At Step S123, the CPU 201 transmits the exchange information retrieved at Step S122 to one of the local communication terminals A-D (the terminal which has transmitted the request received at Step S121). At Step S124, the CPU 201 informs (the terminal having the terminal ID of) the communication partner included in the obtaining request of the exchange information received at Step S121 of predetermined information.

For example, in a case where the obtaining request of the exchange information has been transmitted from the local communication terminal A and the communication partner is the local communication terminal C, the exchange information of the local communication terminal C (having the terminal ID of C) is retrieved among the pieces of information shown in FIG. 12 at Step S122, and the retrieved exchange information is transmitted to the local communication terminal A at Step S123.

Moreover, at Step S124, the information informing the local communication terminal C of the issue of the start request of the TCP communication from the local communication terminal A is transmitted together with the exchange information of the local communication terminal A. When the local communication terminal C receives the transmitted information, the application 151 of the local communication terminal C requests the start of communication from the middleware 152 of the local communication terminal C for starting the communication with the local communication terminal A. Then, also in the local communication terminal C, a communication process is started as described above by referring to FIG. 13.

Returning to FIG. 14, at Step S103, the middleware 152 receives the exchange information transmitted from the relay server 63 at Step S123 in FIG. 15, and obtains it.

Incidentally, in a case where it is judged that the exchange information of the communication partner has been obtained already at Step S101, the processes of Step S102 and Step S103 are skipped.

At Step S104, the middleware 152 executes a TCP connection providing process, which will be described later by referring to FIG. 16. Thereby, the connection of TCP is provided on the basis of the exchange information.

At Step S105, the control module 155 performs the TCP communication on the basis of the connection of TCP provided at Step S104.

Thus, the TCP communication is performed.

Figure 16:
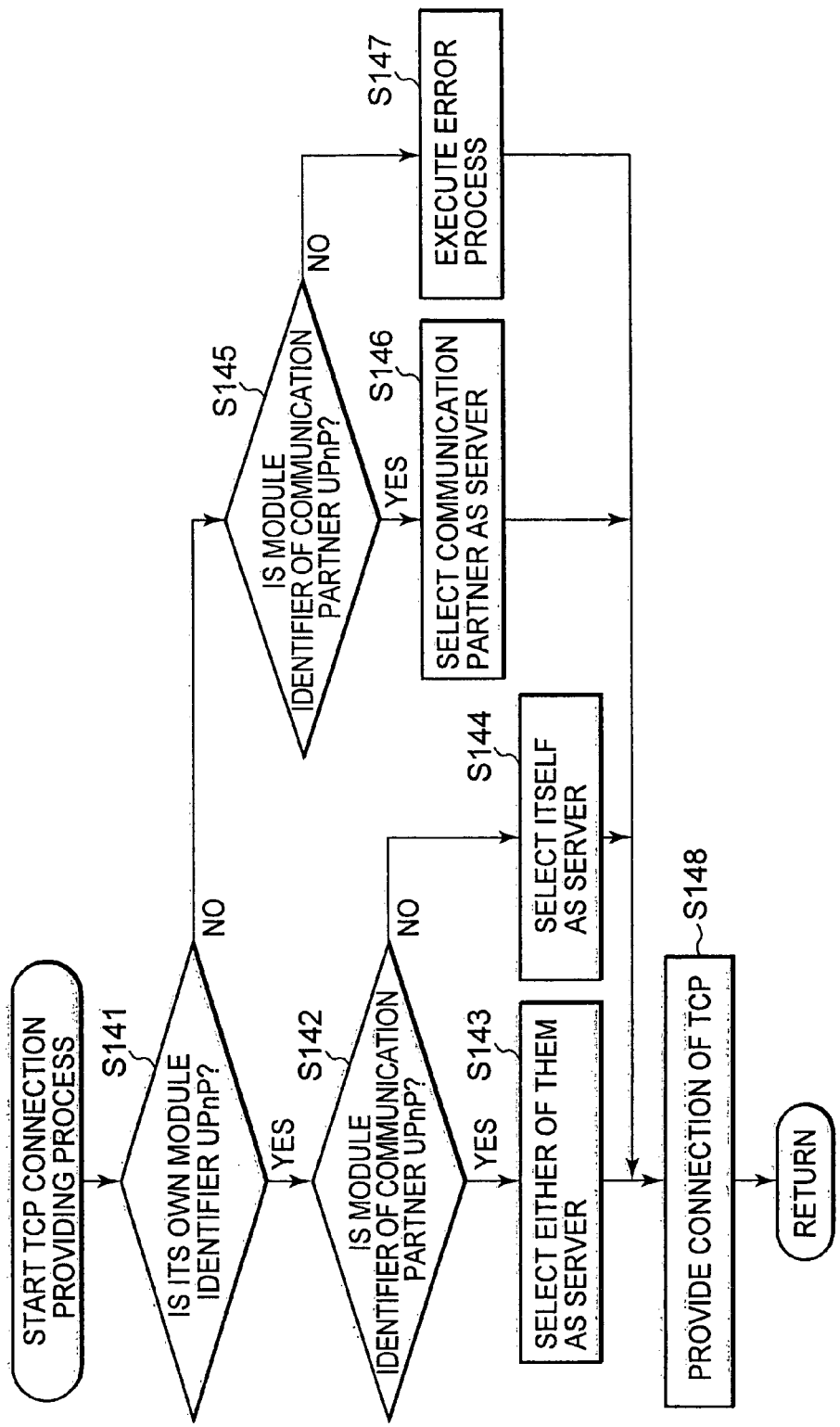
FIG. 16 is a flowchart for explaining a TCP connection providing process.

Next, the flowchart of FIG. 16 is referred to while the details of the TCP connection providing process at Step S104 of FIG. 14 are described.

At Step S141, the middleware 152 judges whether or not its own module identifier is UPnP. In a case where the module identifier is judged to be UPnP, the process advances to Step S142. At Step S142, the middleware 152 judges whether or not the module identifier of the communication partner is UPnP. In a case where the module identifier is judged to be UPnP, the process advances to Step S143. At Step S143, the middleware 152 selects either of them as a server.

For example, in a case where the local communication terminal A communicates with the local communication terminal C, because both of the module identifier of the local communication terminal A (actually the router 41) and the module identifier of the local communication terminal C (actually the router 43) are UPnP as shown in FIG. 12, the local communication terminal A judges that its (local communication terminal A's) own module identifier is UPnP at Step S141, and judges that the module identifier of the communication partner (the local communication terminal C) is UPnP at Step S142. Similarly, the local communication terminal C judges that its (local communication terminal C's) own module identifier is UPnP at Step S141, and judges that the module identifier of the communication partner (the local communication terminal A) is UPnP at Step S142.

At Step S143, for example, transmitter's own IP address and the communication partner's IP address (actually the IP addresses of the router 41 and the router 43) are compared with each other, and the router having a larger IP address is selected as a server. In this case, because the IP address of the local communication terminal C is larger than the IP address of the local communication terminal A, the local communication terminal C is selected as the server. Incidentally, the selection method of the server is not limited to one described above, and in short, the method may be one capable of selecting either of the local communication terminals as a server. Thereby, at Step S148, in the local communication terminal A, the connection of TCP is provided to the control module 155 with the IP address and the port number of the local communication terminal C as the communication partner (actually the IP address and the port number of the router 43) being the IP address and the port number of the server. Moreover, in the local communication terminal C, the connection of TCP is provided to the control module 155 with the IP address and the port number of the local communication terminal C (actually the IP address and the port number of the router 41) being the IP address and the port number of the server.

On the other hand, in a case where it is judged that the module identifier of the communication partner is not UPnP at Step S142, the process advances to Step S144, and the middleware 152 selects the middleware 152 itself as the server.

Moreover, in a case where it is judged that its own module identifier is not UPnP at Step S141, the process advances to Step S145, and the middleware 152 judges whether or not the module identifier of the communication partner is UPnP. In a case where it is judged that the module identifier of the communication partner is UPnP, the middleware 152 selects the communication partner as the server at Step S146.

For example, in a case where the local communication terminal A communicates with the local communication terminal B, the module identifier of the local communication terminal A is UPnP, and the module identifier of the local communication terminal B is not UPnP, as shown in FIG. 12. Consequently, the local communication terminal A judges that its own (local communication terminal A's) module identifier is UPnP at Step S141, and judges that the communication partner's (local communication terminal B's) module identifier is not UPnP at Step S142. Then, at Step S144, the local communication terminal A itself is selected as the server. Thereby, at Step S148, the connection of TCP is provided to the control module 155 with the IP address and the port number of the local communication terminal A itself being as the IP address and the port number of the server.

On the other hand, the local communication terminal B judges that the module identifier of its (local communication terminal B's) own is not UPnP at Step S141, and judges that the module identifier of the communication partner (local communication terminal A) is UPnP at Step S142. Then, at Steps S146, the communication partner is selected as the server. Thereby, at Step S148, the connection of TCP is provided to the control module 155 with the IP address and the port number of the local communication terminal A being as the IP address and the port number of the server.

In a case where it is judged that the module identifier of the communication partner is not UPnP at Step S145, the process advances to Step S147, and the middleware 152 executes an error process.

For example, in a case where the local communication terminal B communicates with the local communication terminal D, because the module identifier of the local communication terminal B is not UPnP and the module identifier of the local communication terminal D is not UPnP, too, as shown in FIG. 12, the local communication terminals B and D judge that their own module identifiers are not UPnP at Step S141, and severally judge that the module identifier of the communication partner is not UPnP at Step S145. In such a case, the port numbers of the local communication terminals B and D (actually the port numbers of the routers 42 and 44) are ones estimated by STUN, and it is impossible to obtain accurate port numbers. Consequently, the connection of TCP cannot be provided. Hence, an error process is executed at Step S147, and the situation of the impossibility of communication is informed to the application 151, and is provided to the user.

Thus, the connection of TCP is provided.

Figure 17:
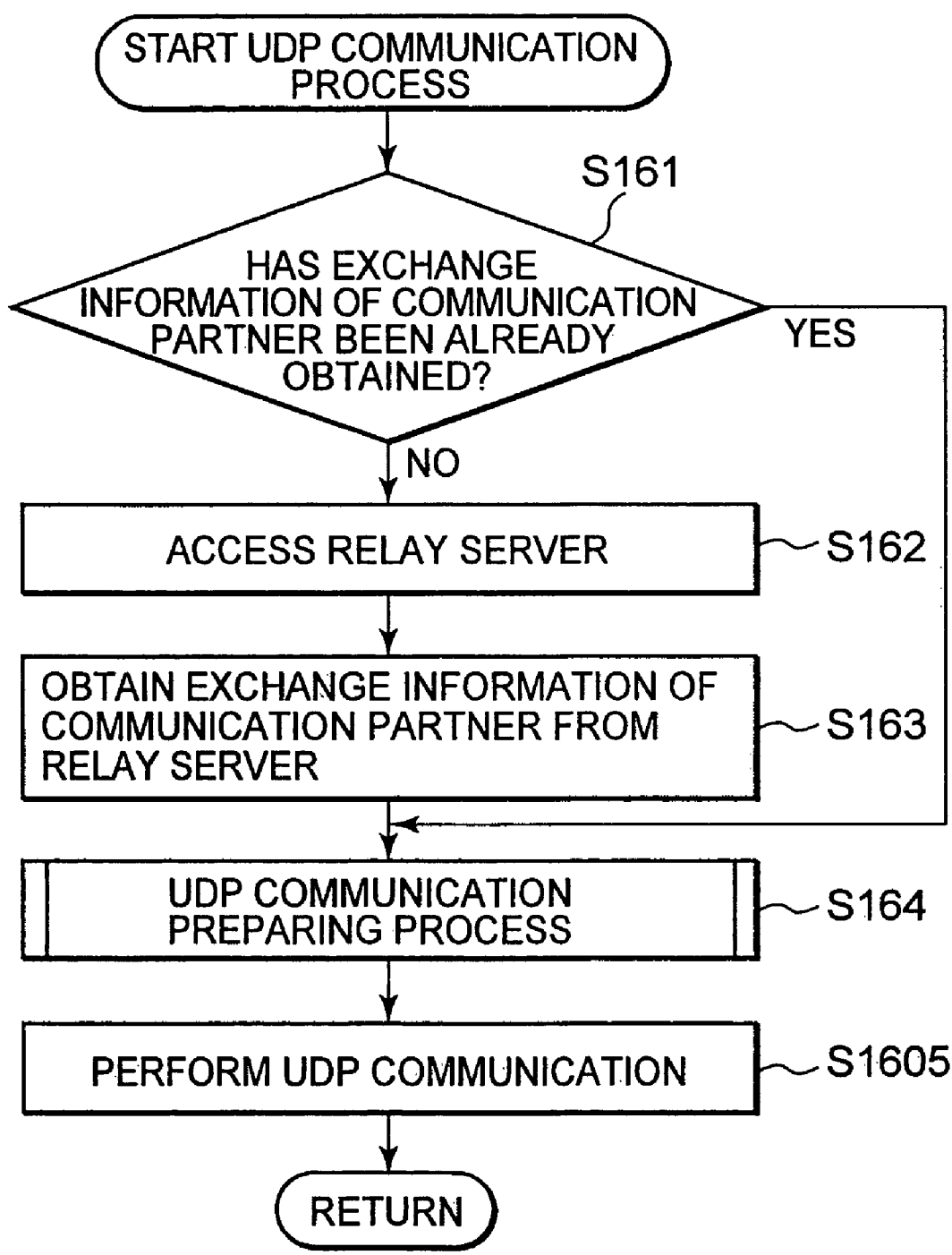
FIG. 17 is a flowchart explaining a UDP communication process.

Next, the flowchart of FIG. 17 is referred to while the UDP communication process at Step S84 of FIG. 13 is described.

At Step S161, the middleware 152 judges whether or not the middleware 152 has already obtained the exchange information of the communication partner. In a case where the middleware 152 judges that it has not obtained the exchange information of the communication partner yet, the process of the middleware 152 advances to Step S162.

At Step S162, the middleware 152 accesses the relay server 63 to transmit an obtaining request of the exchange information. At this time, the obtaining request of the exchange information to be transmitted includes the terminal ID of the communication partner and the information of the kind of communication indicating that the communication is UDP communication. The relay server 63, which has received the obtaining request of the exchange information, executes the exchange information providing process described above by referring to FIG. 15.

At Step S163, the middleware 152 receives the exchange information transmitted from the relay server 63 at Step S123 of FIG. 15, and obtains the exchange information.

Incidentally, in a case where the middleware 152 judges that the middleware 152 has already obtained the exchange information of the communication partner at Step S161, the middleware 152 skips the processes at Step S162 and Step S163.

At Step S164, the middleware 152 executes the UDP communication preparing process, which will be described later by referring to FIG. 18. Thereby, the IP address and the port number to be used for the UDP communication on the basis of the exchange information are set.

At Step S165, the control module 155 performs the UDP communication on the basis of the IP address and the port number, both prepared at Step S164.

Thus, the UDP communication is performed.

Figure 18:
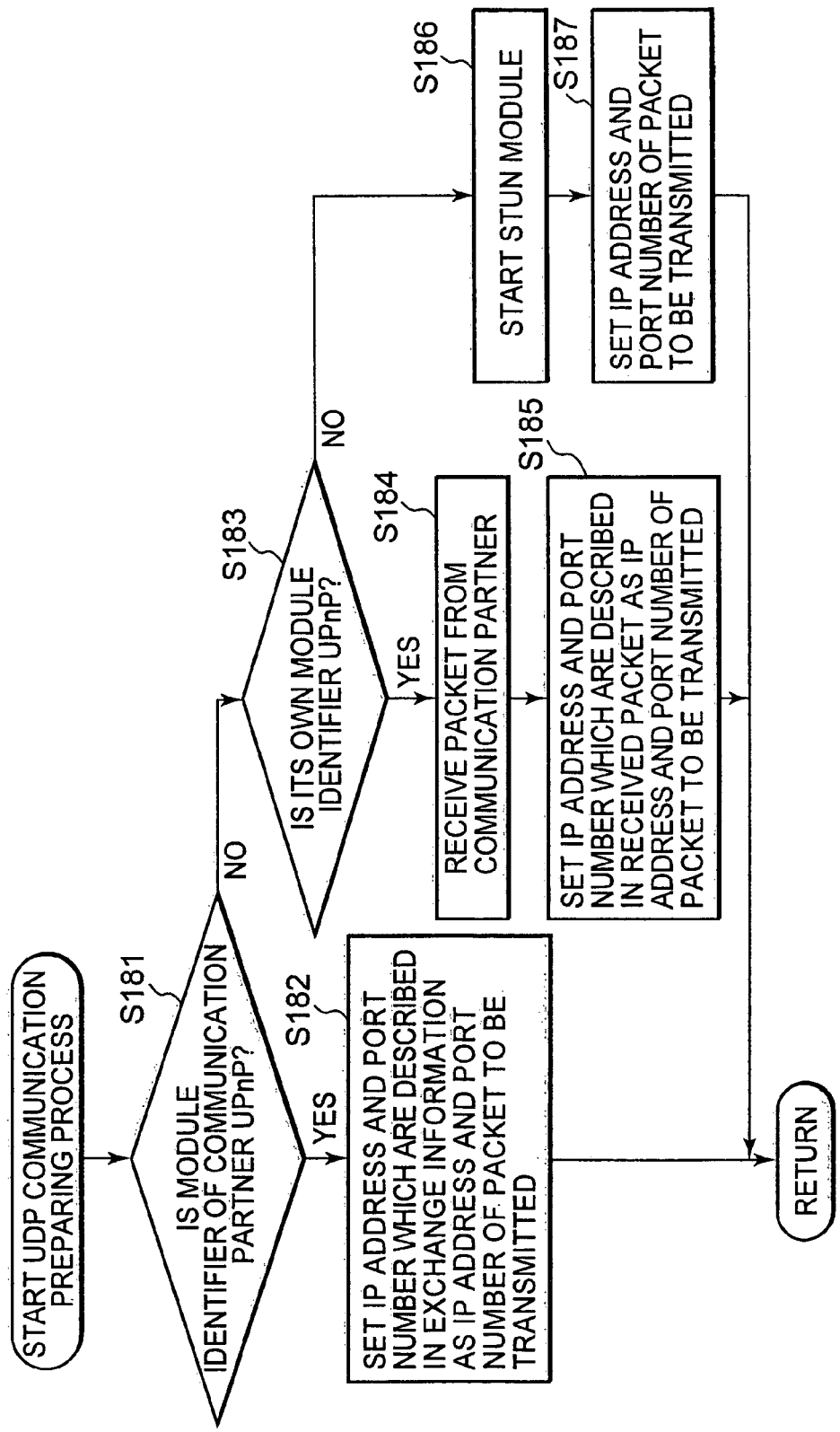
FIG. 18 is a flowchart explaining a UDP communication preparing process.

Next, the flowchart of FIG. 18 is referred to while the UDP communication preparing process at Step S164 of FIG. 17 is described.

At Step S181, the middleware 152 judges whether or not the module identifier of the communication partner is UPnP. In a case where the middleware 152 judges that the module identifier of the communication partner is UPnP, the middleware 152 sets the transmission destination IP address and the transmission destination port number of a packet to be transmitted as the IP address and the port number, both described in the exchange information, at Step S182.

For example, in a case where the local communication terminal A communicates with the local communication terminal C, because both of the module identifier of the local communication terminal A (actually the router 41) and the module identifier of the local communication terminal C (actually the router 43) are UPnP, as shown in FIG. 12, the local communication terminal A judges that the module identifier of the communication partner (local communication terminal C) is UPnP at Step S181, and sets the IP address and the port number, both described in the exchange information of the local communication terminal C being the communication partner, as the transmission destination IP address and the transmission destination port number, respectively, of a packet to be transmitted, at Step S182. Similarly, also the local communication terminal C judges that the module identifier of the communication partner (local communication terminal A) is UPnP at Step S181, and sets the IP address and the port number, both described in the exchange information of the local communication terminal A being the communication partner as the transmission destination IP address and the transmission destination port number, respectively, of the packet to be transmitted, at Step S182. After that, the local communication terminals A and C can perform the UDP communication of the NAT traversal.

On the other hand, when the middleware 152 judges that the module identifier of the communication partner is not UPnP at Step S181, the process of the middleware 152 advances to Step S183. The middleware 152 judges whether or not its own module identifier is UPnP. In a case where the middleware 152 judges that its own module identifier is UPnP, the process of the middleware 152 advances to Step S184, and receives the packet from the communication partner. Then, at Step S185, the middleware 152 sets the transmission destination IP address and the transmission destination port number of a packet to be transmitted as the IP address and the port number, respectively, which are described in the transmission source IP address and the transmission source port number, respectively, of the packet received at Step S184.

For example, in a case where the local communication terminal A communicates with the local communication terminal B, because the module identifier of the local communication terminal A is UPnP and the module identifier of the local communication terminal B is not UPnP as shown in FIG. 12, the local communication terminal B judges that the module identifier of the communication partner (local communication terminal A) is UPnP at Step S181, and sets the IP address the port number of the communication partner (local communication terminal A) described in the exchange information as the transmission destination IP address and the transmission destination port number of a packet to be transmitted, respectively, at Step S182. Now, because the port number of the local communication terminal A described in the exchange information is one which is set to be opened by the function of UPnP™ and is preengaged, the setting of the port number as the transmission destination port number would enable the local communication terminal B to transmit a packet surely to the local communication terminal A by the UDP communication after that.

On the other hand, the local communication terminal A judges that the module identifier of the communication partner (local communication terminal B) is not UPnP at Step S181, and judges that its (local communication terminal A's) own module identifier is not UPnP at Step S183.

At this time, the local communication terminal A may therein set the IP address and the port number of the local communication terminal B (actually the IP address and the port number of the router 42), both described in the exchange information, as the transmission destination IP address and the transmission destination port number, respectively. However, the port number of the local communication terminal B described in the exchange information is one estimated by STUN, and consequently the port number includes uncertainty. Hence, in a case where the port number is set as the transmission destination port number, there is the possibility that no communication can perform. Accordingly, at Step S184, the middleware 152 receives the packet from the local communication terminal B, and sets the transmission source IP address and the transmission source port number of the packet as the transmission destination IP address and the transmission destination port number of the packet to be transmitted later, respectively.

Thereby, the local communication terminal A and the local communication terminal B can surely perform the UDP communication.

Moreover, in a case where the middleware 152 judges that its own module identifier is not UPnP at Step S183, the process of the middleware 152 advances to Step S186. The middleware 152 starts the STUN module 153. At Step S187, the STUN module 153 sets the transmission destination IP address and the transmission destination port number of a packet to be transmitted, in a manner which will be described later.

For example, in a case where the local communication terminal B and the local communication terminal D communicate with each other, because the both of the module identifiers of the local communication terminal B and the local communication terminal D are not UPnP as shown in FIG. 12, the local communication terminals B and D severally judge that the module identifier of the communication partner is not UPnP at Step S181, and judge that their own module identifiers are not-UPnP at Step S183.

Then, at Step S186, the STUN module 153 is started, and at Step S187, the transmission destination IP address and the transmission destination port number of a packet to be transmitted later are set.

At Step S187, the IP address and the port number of the local communication terminal B or the local communication terminal D, both described in the exchange information, may be set as the transmission destination IP address and the transmission destination port number, respectively. Alternatively, similarly to the case described above by referring to FIG. 10, the STUN module 153 may estimate the port number of the NAT, and the local communication terminal B and the local communication terminal D may exchange the estimated port number of the NAT of the local communication terminal B or the local communication terminal D, and then the port number may be set as the transmission destination port number. Because the port number of the NAT is not preengaged in a case of STUN differently from the case of UPnP, the estimation of the port number of the NAT immediately before communication would enable surer communication.

Thus, the IP address and the port number to be used for UDP communication are set.

As described above, according to the present invention, P2P communication which could no be provided by the conventional NAT traversal method such as UPnP™ and STUN can be provided. FIG. 19 is a diagram showing a pattern of the P2P communication which UPnP™ or STUN can provide and the P2P communication which the present invention can provide.

In the figure, NAT (router) A and NAT (router) B severally indicate whether or not routers (NAT) to which two communication terminals performing P2P communication are connected have UPnP functions. In a case where the router (NAT) includes the UPnP™ function, the router (NAT) is indicated as "UPnP". In a case where the router (NAT) does not include the UPnP™ function, the router (NAT) is indicated as "NonUPnP". Moreover, "protocol" indicates whether the protocol used in the P2P communication is TCP or UDP. On the right side of "protocol", whether or not the P2P communication can be provided in each of the case of using the UPnP module 154 singly, the case of using the STUN module 153 singly and the case of the present invention (using a combination of the UPnP module 154 and the STUN module 153) is indicated by the marks of a circle (triangle) or a cross in the view. Incidentally, the mark of triangle in the view indicates that P2P communication can be provided with uncertainty.

Pattern 1 indicates the case where the communication terminals connected to the routers of NAT (router) A being "UPnP" and NAT (router) B being "UPnP" perform P2P communication of the NAT traversal by means of the TCP communication. For example, the case where the local communication terminal A and the local communication terminal C in FIG. 1 perform TCP communication in the communication process of FIG. 13 corresponds to the pattern.

Pattern 2 indicates the case where the communication terminals connected to the routers of NAT (router) A being "UPnP" and NAT (router) B being "NonUPnP" perform P2P communication of the NAT traversal by means of the TCP communication. For example, the case where the local communication terminal A and the local communication terminal B in FIG. 1 perform TCP communication in the communication process of FIG. 13 corresponds to the pattern.

Because TCP connection cannot be provide only by the STUN module 153 in both the cases of the pattern 1 and the pattern 2, a cross mark is described. On the other hand, because the TCP connection can be provided in the case of using the UPnP module 154 singly or in the case of the present invention, circle marks are described.

Pattern 3 indicates the case where the communication terminals connected to the routers of NAT (router) A being "NonUPnP" and NAT (router) B being "NonUPnP" perform P2P communication of the NAT traversal by means of the TCP communication. For example, the case where the local communication terminal B and the local communication terminal D in FIG. 1 perform TCP communication in the communication process of FIG. 13 corresponds to the pattern.

Because TCP connection cannot be provide in any of the cases of using the STUN module 153 singly, of using the UPnP module 154 singly and of the present invention, a cross mark is described in each of the cases.

Pattern 4 indicates the case where the communication terminals connected to the routers of NAT (router) A being "UPnP" and NAT (router) B being "UPnP" perform P2P communication of the NAT traversal by means of the TCP communication. For example, the case where the local communication terminal A and the local communication terminal C in FIG. 1 perform TCP communication in the communication process of FIG. 13 corresponds to the pattern.

Pattern 5 indicates the case where the communication terminals connected to the routers of NAT (router) A being "UPnP" and NAT (router) B being "NonUPnP" perform P2P communication of the NAT traversal by means of the TCP communication. For example, the case where the local communication terminal A and the local communication terminal B in FIG. 1 perform TCP communication in the communication process of FIG. 13 corresponds to the pattern.

In the cases of the pattern 4 and the pattern 5, P2P communication can be provided by using the STUN module 153 singly. Incidentally, because the STUN module 153 estimates the port number of the NAT to be used with uncertainty as described above, a triangle mark is described (in a case where the estimation is not performed as conventional STUN, a cross mark is concluded to be described). On the other hand, because P2P communication can be surely provided on the basis of the port number preengaged by UPnP™ in the case of using the UPnP module 154 singly or the case of the present invention, circle marks are described.

Pattern 6 indicates the case where the communication terminals connected to the routers of NAT (router) A being "NonUPnP" and NAT (router) B being "NonUPnP" perform P2P communication of the NAT traversal by means of the UDP communication. For example, the case where the local communication terminal B and the local communication terminal D in FIG. 1 perform UDP communication in the communication process of FIG. 13 corresponds to the pattern.

Because P2P communication can be provide by using the STUN module 153 singly (though uncertainty accompanies the communication) in the case of the pattern 6, a triangle mark is described (a cross mark would be described in a case of having no estimation function). On the other hand, because the IP address and the port number of the communication partner cannot be specified in the case of using the UPnP module 154 singly, a cross mark is described. Because the present invention performs communication by means of the STUN module 153 in such a case (at Step S186 or Step S187 in FIG. 18), P2P communication can be provided, though the uncertainty accompanies the communication, a triangle mark is described.

As described above, because the present invention provides P2P communication by combining STUN having the estimation function with UPnP™, the P2P communication can be provided in all of the patterns except the pattern 3. Moreover, in case of the pattern 4 or the pattern 5, because the P2P communication is provided on the basis of the port number preengaged by UPnP™, not of STUN with uncertainty, the P2P communication can be provided more surely.

Incidentally, it is no matter that the above-mentioned series of processes is realized by hardware or software. In the case where the above-mentioned series of processes is executed by software, a program constituting the software is installed into a computer incorporated in dedicated hardware, a general-purpose personal computer capable of installing various programs to execute various functions, or the like through a network or a recording medium.

Moreover, in the present specification, the steps of executing the above-mentioned series of processes naturally include processes preformed in a time series along a described order, and also include the processes executed in parallel or individually even if the processes are not necessarily performed in time series.

What is claimed is:

1. An information communication system, comprising:
a first information processing apparatus connected to a first network and to a second network through a first address information converting apparatus for converting address information;
a second information processing apparatus connected to a third network and to the second network through a second address information converting apparatus for converting address information;
an information management apparatus connected to the second network for managing address information of the first information processing apparatus and of the second information processing apparatus on the second network;
a first address information providing apparatus connected to the second network for providing first address information, including an IP address and a first port number, of the first information processing apparatus on the second network, the first address information obtained from a first communication from the first address information converting apparatus; and
a second address information providing apparatus connected to the second network for providing second address information, including the IP address and a second port number, of the first information processing apparatus on the second network, the second address information obtained from a second communication from the first address information converting apparatus,
wherein:
the first information processing apparatus includes:
means for judging whether the first address information converting apparatus has means for communicating on the second network using a first protocol, and whether the second address information converting apparatus has means for communicating on the second network using the first protocol;
means for obtaining the address information of the second information processing apparatus on the second network from the means for communicating using the first protocol of the second address information converting apparatus, and for registering the obtained address information in the information management apparatus, when it is judged that the second address information converting apparatus has the means for communicating using the first protocol; and
means for estimating the address information of the first information processing apparatus on the second network based on the first address information and the second address information, and for registering the estimated address information in the information management apparatus when it is judged that neither the first address information converting apparatus nor that the second information processing apparatus has the means for communicating using the first protocol,
the information management apparatus includes:
means for receiving the address information of the first or the second information processing apparatus on the second network;
means for storing the received address information; and means for providing the stored address information to the first or the second information processing apparatus, and the first information processing apparatus obtains the address of the second information processing apparatus on the second network from the information management apparatus to communicate with the second information processing apparatus.

2. The information communication system of claim 1, wherein the first protocol includes Universal Plug and Play (UPnP).

3. A first information processing apparatus connected to a first network and to a second network through a first address information converting apparatus, the first information processing apparatus being configured to communicate with a second information processing apparatus connected to a third network and to the second network through a second address information converting apparatus, the first information processing apparatus comprising:

means for judging whether the first address information converting apparatus has means for communicating on the second network using a first protocol, and for judging whether the second address information converting apparatus has means for communicating on the second network using the first protocol;

means for obtaining an address of the second information processing apparatus on the second network from the means for communicating using the first protocol of the second information converting apparatus, and for registering the obtained address in an information management apparatus connected to the second network when it is judged that the second address information converting apparatus has the means for communicating using the first protocol;

means for, when it is judged that neither the first address information converting apparatus nor the second address information converting apparatus has the means for communicating using the first protocol:

estimating an address of the first information processing apparatus on the second network based on first address information, including an IP address and a first port number, of the first information processing apparatus on the second network received from a first communication from the first address information converting apparatus, and second address information, including the IP address and a second port number, of the first information processing apparatus on the second network received from a second communication from the first address information converting apparatus, and registering the estimated address in an the information management apparatus.

4. The first information processing apparatus according to claim 3, wherein:

the means for obtaining and the means for estimating further comprise means for setting identification information indicating whether the first address information converting apparatus has the means for communicating using the first protocol, and the information management apparatus registers the identification information.

5. The first information processing apparatus according to claim 3, further comprising:

protocol judging means connected to the third network for judging a protocol used for communication with the second information processing apparatus during communication with the second information processing apparatus;

TCP communication means for performing TOP communication with the second information processing apparatus when the protocol judging means judges that a protocol used for the communication with the second information processing apparatus is TCP; and UDP communication means for performing UDP communication with the second information processing apparatus when the protocol judging means judges that the protocol used for the communication with the second information processing apparatus is UDP.

6. The first information processing apparatus according to claim 5, wherein the TCP communication means comprises:

means for obtaining the address of the second information processing apparatus on the second network and identification information of the second information processing apparatus from the information management apparatus; and means for providing a TCP connection based on the obtained address and the obtained identification information of the second information processing apparatus.

7. The first information processing apparatus according to claim 6, wherein:

the means for judging judges whether the first address information converting apparatus has the means for communicating using the first protocol based on the identification information of the first information processing apparatus, and judges whether the second address information converting apparatus has the means for communicating using the first protocol based on the identification information of the second information processing apparatus; and the means for providing the TCP connection comprises means for enabling the TOP connection depending on judgment results.

8. The first information processing apparatus according to claim 5, wherein:

the UDP communication means comprises:

means for obtaining the identification information of the second information processing apparatus and the address of the second information processing apparatus on the second network from the information management apparatus; and means for preparing the UDP communication based on the obtained address and the obtained identification information of the second information processing apparatus.

9. The first information processing apparatus according to claim 8, wherein:

the means for preparing the UDP communication further comprises:

means for judging whether the first address information converting apparatus has the means for communicating using the first protocol based on the obtained identification information of the first information processing apparatus; and means for judging whether the second address information converting apparatus has the means for communicating using the first protocol based on the identification information of the second information processing apparatus, and the means for preparing the UDP communication prepares the UDP communication depending on the judgment results.

10. The first information processing apparatus of claim 3, wherein the first protocol includes Universal Plug and Play (UPnP).

11. A method of a first information processing apparatus connected to a first network and to a second network through an address information converting apparatus, for communicating with a second information processing apparatus connected to a third network and to the second network through a second address information converting apparatus, the method comprising:
- judging whether the first address information converting apparatus has means for communicating on the second network using a first protocol;
- judging whether the second address information converting apparatus has means for communicating on the second network using the first protocol:
- when it is judged that the first address information converting apparatus has the means for communicating using the first protocol:
  - obtaining an address of the second information processing apparatus on the second network from the means for communicating using the first protocol; and
  - registering the obtained address in an information management apparatus connected to the second network;
- when it is judged that the neither the first address information converting apparatus nor the second address information converting apparatus has the means for communicating using the first protocol:
  - providing, to the first information processing apparatus a first address, including an IP address and a first port number, of the first information processing apparatus on the second network from a first address information providing apparatus connected to the second network, the first address information obtained from a first communication from the first address information converting apparatus;
  - providing, to the first information processing apparatus a second address, including the IP address and a second port number, of the first information processing apparatus on the second network from a second address information providing apparatus connected to the second network, the second address information obtained from a second communication from the second address information converting apparatus;
  - estimating an address of the first information processing apparatus on the second network based on the first address and the second address; and
  - registering the estimated address in the information management apparatus.

12. The method of claim 11, wherein the first protocol includes Universal Plug and Play (UPnP).

13. A computer-readable medium having stored thereon a computer program which, when executed by a first information processing apparatus connected to a first network and to a second network through a first address information converting apparatus, causes the first information processing apparatus to perform method of communicating with a second information processing apparatus connected to a third network and to the second network through a second address information converting apparatus, the method comprising:
- judging whether the first address information converting apparatus has means for communicating on the second network using a first protocol;
- judging whether the second address information converting apparatus has means for communicating on the second network using the first protocol;
- when it is judged that the first address information converting apparatus has the means for communicating using the first protocol:
  - obtaining an address of the second information processing apparatus on the second network from the means for communicating using the first protocol; and
  - registering the obtained address in an information management apparatus connected to the second network;
- when it is judged that the neither the first address information converting apparatus nor the second address information converting apparatus has the means for communicating using the first protocol:
  - providing, to the first information processing apparatus, a first address, including an IP address and a first port number, of the first information processing apparatus on the second network from a first address information providing apparatus connected to the second network, the first address information obtained from a first communication from the first address information converting apparatus;
  - providing, to the first information processing apparatus a second address, including the IP address and a second port number, of the first information processing apparatus on the second network from a second address information providing apparatus connected to the second network, the second address information obtained from a second communication from the second address information converting apparatus;
  - estimating an address of the first information processing apparatus on the second network based on the first address and the second address; and
  - registering the estimated address in the information management apparatus.

14. The computer-readable medium of claim 13, wherein the first protocol includes Universal Plug and Play (UPnP).

* * * * *

UNITED STATES PATENT AND TRADEMARK OFFICE
CERTIFICATE OF CORRECTION

PATENT NO. : 7,542,466 B2
APPLICATION NO. : 10/983555
DATED : June 2, 2009
INVENTOR(S) : Toshiya Ikenaga et al.

Page 1 of 1

It is certified that error appears in the above-identified patent and that said Letters Patent is hereby corrected as shown below:

In claim 3, column 31, line 52, change "in an the" to --in the--.

In claim 5, column 32, line 4, change "TOP" to --TCP--.

In claim 7, column 32, line 36, change "TOP" to --TCP--.

In claim 11, column 33, line 16, change "protocol:" to --protocol;--.

*In claim 11, column 33, line 25, change "that the neither" to --that neither--.

In claim 11, column 33, line 29, change "apparatus" to --apparatus,--.

In claim 11, column 33, line 37, change "apparatus" to --apparatus,--.

*In claim 13, column 34, line 24, change "that the neither" to --that neither--.

In claim 13, column 34, line 36, change "apparatus" to --apparatus,--.

Signed and Sealed this

Third Day of November, 2009

David J. Kappos
*Director of the United States Patent and Trademark Office*